United States Patent [19]

Ohtomo et al.

[11] Patent Number: 5,684,579
[45] Date of Patent: Nov. 4, 1997

[54] AUTOMATIC TILT ANGLE COMPENSATOR

[75] Inventors: Fumio Ohtomo; Jun-ichi Kodaira, both of Tokyo-to, Japan

[73] Assignee: Kabushiki Kaisha Topcon, Tokyo-to, Japan

[21] Appl. No.: 503,657

[22] Filed: Jul. 18, 1995

[30] Foreign Application Priority Data

Jul. 22, 1994 [JP] Japan .................................. 6-192221
Oct. 20, 1994 [JP] Japan .................................. 6-281286

[51] Int. Cl.$^6$ ................................................ G01C 9/18
[52] U.S. Cl. ........................................ 356/249; 356/148
[58] Field of Search ............................... 356/148, 249, 356/250; 33/366, 377, 378, 396

[56] References Cited

U.S. PATENT DOCUMENTS 3,905,707  9/1975  Feist et al. ........................ 356/249
5,513,001  4/1996  Ohtomo et al. .................... 356/249

*Primary Examiner*—Samuel A. Turner
*Attorney, Agent, or Firm*—Nields, Lemack & Dingman

[57] ABSTRACT

The automatic tilt angle compensator of the present invention includes a liquid sealing container with a transparent liquid sealed therein to form a free liquid surface, a light projecting system for projecting light beam to the free liquid surface at a given angle so that it is reflected by the free liquid surface, an optical axis dividing means for dividing an optical axis of the light projecting system, a first light entry means for allowing the light beam from the light projecting system to pass into the sealing container, a second light entry means for allowing the light beams divided by the dividing means into the sealing container, a first light irradiating means for irradiating the light beam reflected by the free liquid surface from the sealing container, and a second light irradiating means arranged face-to-face to the first light irradiating means, whereby a light beam entering the liquid sealing container from the first light entry means is irradiated by the first light irradiating means, and when the system is turned down by 90°, the light beam divided by the dividing means enters the liquid sealing container from the second entry means and is reflected by the free liquid surface rotated by 90° and is irradiated by the second irradiating means.

18 Claims, 16 Drawing Sheets

AUTOMATIC TILT ANGLE COMPENSATOR

BACKGROUND OF THE INVENTION

The present invention relates to an automatic angle compensator used in surveying or measuring instruments for measuring changes of tilting, or for maintaining an optical axis of the instrument in vertical direction or in horizontal direction or for forming an irradiation plane of horizontal or vertical light beam.

When various surveying operations are performed using a surveying or measuring instrument, it is necessary to compensate the reference plane of the instrument or to compensate verticality of the optical axis.

In the past, automatic compensators for such purpose have been known. For example, a pendulum such as a lens or a prism is suspended by two or three or more suspension lines, and when the main unit of the surveying or measuring instrument is tilted, the pendulum is braked by magnetic or other type braking mechanism, and optical path is automatically compensated. Or, utilizing rear surface reflection of transparent liquid, it is attempted in such manner that reflected light beam has an optical axis of the same sensitivity with respect to the change of every tilting direction of the liquid surface using an optical system such as anamorphic prism, and optical path is automatically compensated.

However, in the conventional technique as described above, it can be used only when the entire system is installed at approximately horizontal or vertical position, and it is difficult to use the compensator at both approximately horizontal or approximately vertical positions. To use the compensator for both purposes, it is necessary to separately provide an optical system for changing the optical path or to design a part of the optical system as replaceable and to replace a part of the optical system to suit the approximately horizontal or approximately vertical positions where the compensator is used. In such cases, removal or assembling of the optical system leads to lower reproducibility and poor accuracy. Also, the problem of increased cost for the components arises.

SUMMARY OF THE INVENTION

To solve the above problems, it is an object of the present invention to automatically compensate optical path utilizing a free liquid surface regardless of whether the system is at approximately horizontal position or at approximately vertical position without requiring a specially prepared optical system or an additional mechanism replacing a part of the optical system, and another object of the invention is to detect tilt angle of the system. To attain the above objects, the automatic tilt angle compensator of the present invention comprises a liquid sealing container with a transparent liquid sealed therein to form a free liquid surface, a light projecting system for projecting light beam to the free liquid surface at a given angle so that it is reflected by the free liquid surface, an optical axis dividing means for dividing an optical axis of the light projecting system, a first light entry means for allowing the light beam from the light projecting system to pass into the sealing container, a second light entry means for allowing the light beams divided by the dividing means to pass into the sealing container, a first light irradiating means for irradiating the light beam reflected by the free liquid surface from the sealing container, and a second light irradiating means arranged face-to-face to the first light irradiating means, whereby, when the system is turned down by 90°, the light beam divided by the dividing means enters the liquid sealing container from the second irradiating means and is reflected by the free liquid surface rotated by 90° and is irradiated by the second light entry means, the first light irradiating means is a first reflection member for reflecting the light beam, reflected by the free liquid surface when the system is tilted by nearly 0°, again toward the free liquid surface, the second light irradiating means is a second reflecting member for reflecting the light beam, reflected by the free liquid surface when the system is tilted by nearly 90°, again toward the free liquid surface, the first light irradiating means is a first emitting window provided on the liquid sealing container, the second light irradiating means is a second emitting window provided on the liquid sealing container, the light beam irradiated by the light projecting system is a polarized light beam having a defined direction of polarization, there is further provided a polarized light converting means for projecting light beams having different polarized properties toward the optical path dividing means when the system is tilted by nearly 0° and when it is tilted by nearly 90°, the optical path dividing means comprises a polarized light beam splitter, and in the light beam irradiated by the light projecting system, the direction of polarization is that of the defined polarized light, the dividing means is a polarized light beam splitter, and when the direction of polarization is rotated by a first birefringence member movably arranged on the optical axis between the light projecting system and the polarized light beam splitter and when the entire system is turned down by 90°, the movably arranged birefringence member is deviated from the optical axis, the optical axis of the light beam from the light projecting system is separated from the optical axis before the entire system has been turned down by 90° by the polarized light beam splitter, the light beam reflected by the free liquid surface is irradiated from the liquid sealing container by the second light irradiating means, the polarized light converting means is a first birefringence member removably arranged in the optical path of the light projecting system depending upon the tilting of the system and for rotating the direction of polarization of the light beam when it is arranged in the optical path, and the first birefringence member is a λ/2 phase plate, and the second birefringence member is a λ/4 phase plate.

DETAILED DESCRIPTION OF THE PREFERRED EMBODIMENTS

In the following, description will be given on an embodiment of the present invention in connection with the drawings.

Figure 1:
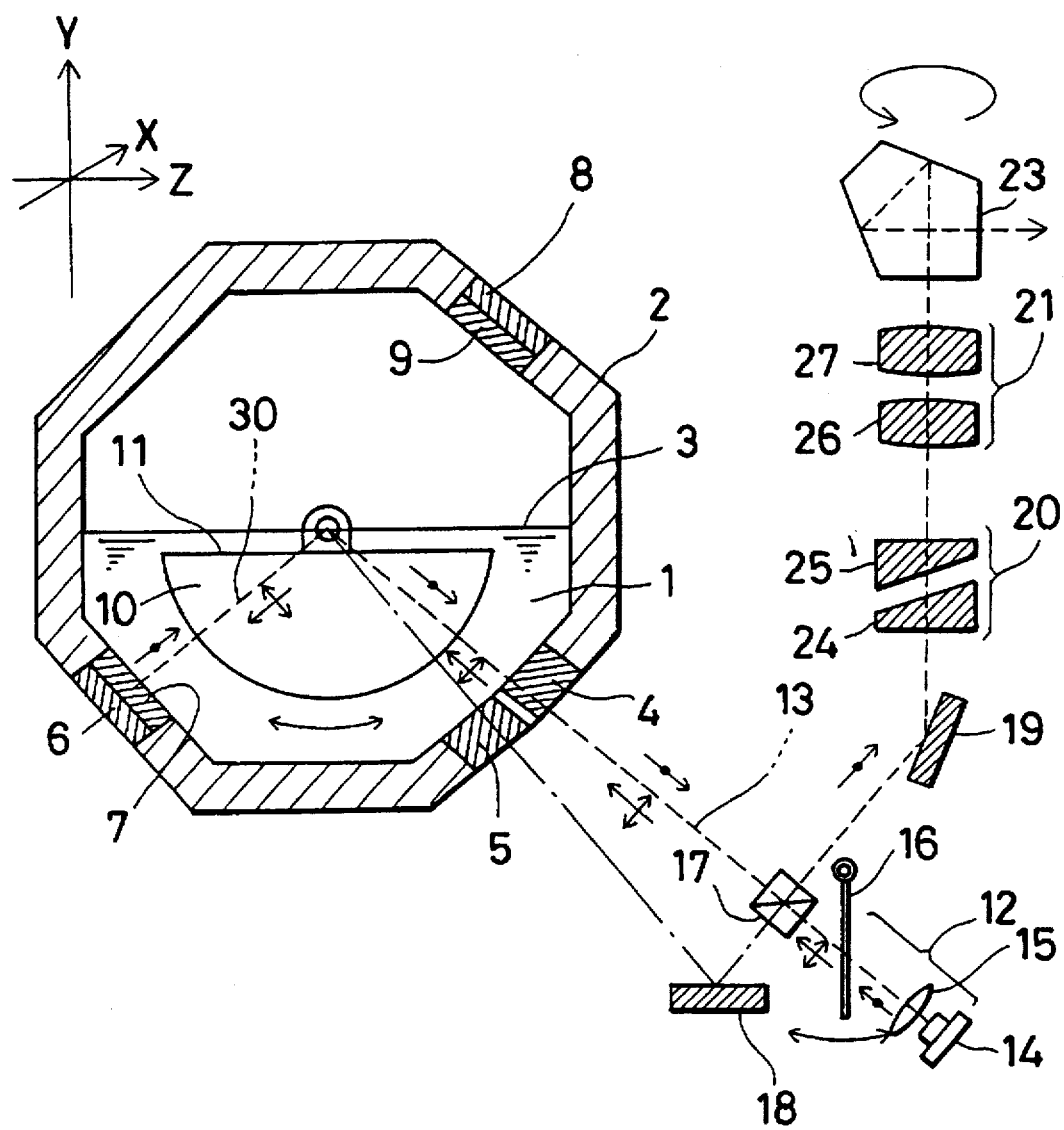
FIG. 1 is a drawing to explain a first embodiment of the present invention.

FIG. 1 represents a first embodiment of the invention. A liquid sealing container 2 is provided, in which a transparent liquid 1 is sealed to form a free liquid surface 3. The liquid sealing container 2 is designed as a short column of approximately octagonal shape. Of the planes forming the octagon, on one plane adjacent to the bottom plane, a first entry/exit window 4 is arranged, and a second entry/exit window 5 is arranged next to the first entry/exit window 4. On another plane adjacent to the bottom plane, a first reflection mirror 6 serving as a reflection member is provided, and a λ/4 phase plate 7 is disposed on a reflection surface of the first reflection mirror 6. A second reflection mirror 8 serving as a reflection member is disposed at a position opposite to the first reflection mirror 6, and a λ/4 phase plate 9 of a birefringence member is disposed on a reflection surface of the second reflection mirror 8.

A liquid movement preventing device 10 is movably arranged inside the liquid sealing container 2. The liquid movement preventing device 10 has a moving shaft, which is located in the free liquid surface 3 and is consistent with the center of the liquid sealing container 2.

As described later, the liquid movement preventing device 10 has a transparent liquid movement preventing plate 11, which is positioned slightly below the free liquid surface 3 of the transparent liquid 1 and is hence immersed in the liquid. The center of gravity of the liquid movement preventing device is located below the moving shaft so that it is freely rotatable and the liquid movement preventing plate 11 is held at horizontal position.

A light projecting system 12 is provided with an light axis which irradiates a light beam 13 at a given angle, preferably at more than 45°, with respect to the horizontal free liquid surface 3 so that it is reflected by the free liquid surface 3 of the transparent liquid 1.

The light projecting system 12 comprises a light source unit 14, i.e. a semiconductor laser for emitting approximately linearly polarized laser beam having a direction of polarization perpendicular to the paper surface, a collimator lens 15 transforming the light beam coming from the light source unit 14 into parallel beam, a λ/2 phase plate 16 of a polarized light converting means rotatably suspended and made of a birefringence member and used for converting the direction of polarization, and a polarized light beam splitter 17. The polarized light beam splitter 17 allows a linearly polarized light component which is parallel to the paper surface to pass and reflects a linearly polarized light component which is perpendicular to the paper surface.

A first reflection mirror 18 for reflecting the light beam 13 toward the polarized light beam splitter 17 is arranged adjacent to the polarized light beam splitter 17, and a second reflection mirror 19 is arranged at a position opposite to the first reflection mirror 18 with the polarized light beam splitter 17 therebetween. The second reflection mirror 19 reflects the light, which has been reflected by the first reflection mirror 18 and has passed through the polarized light beam splitter 17, in the vertical direction in FIG. 1. Along the optical axis of the light beam reflected by the second reflection mirror 19, an anamorphic prism system 20, a beam expander 21, and a pentagonal prism 23 rotated around the optical axis of the light beam reflected by the second reflection mirror 19 are arranged in this order as seen from the second reflection mirror 19.

As described later, the polarized light beam splitter 17, the first reflection mirror 18 and the second reflection mirror 19 constitute a projection optical system, which projects a reflection light beam emitted through the first entry/exit window 4 via the first reflection mirror 6 and a reflection light beam 30 emitted through the second entry/exit window 5 via the second reflection mirror 8 both in vertical direction.

Next, description will be given on the operation of the system.

After being emitted from the light source unit 14, the light beam 13 passes through the λ/2 phase plate 16 and is turned to a linearly polarized light beam parallel to the paper surface. As already described, the polarized light beam splitter 17 allows the linearly polarized light, which is parallel to the paper surface, to pass. Thus, the light beam coming from the light source unit 14 passes through the polarized light beam splitter 17 and enters the transparent liquid 1 via the first entry/exit window 4, and it further passes through the liquid movement preventing plate 11 and is reflected by the free liquid surface 3 toward the first reflection mirror 6.

The light beam is reflected by the first reflection mirror 6, passes through the liquid movement preventing plate 11, is reflected by the free liquid surface 3 and is irradiated through the first entry/exit window 4. The first reflection mirror 6 serves as a first light irradiating means, which irradiates again the light beam, which has entered the liquid sealing container 2.

On the reflection surface of the first reflection mirror 6, the λ/4 phase plate 7 is provided, and the light beam 13 passes through the λ/4 phase plate 7 twice in the process of being reflected by the first reflection mirror 6. For this reason, the direction of polarization of the reflected light beam 30 reflected by the first reflection mirror 6 is a linearly polarized light perpendicular to the paper surface.

The reflected light beam 30 is irradiated through the first entry/exit window 4 and enters the polarized light beam splitter 17. Because the reflected light beam 30 is a linearly polarized light perpendicular to the paper surface, it is reflected by the polarized light beam splitter 17 and is reflected by the second reflection mirror 19 in vertical direction.

The free liquid surface 3 is always maintained in horizontal direction even when the entire system of the present embodiment is tilted, and the light beam 13 is always reflected by the horizontal plane. Therefore, incident angle of the light beam 13 with respect to the free liquid surface 3 is changed depending upon the tilting of the entire system of the present embodiment, and the optical axis of the light beam reflected by the second reflection mirror 19 is also tilted with respect to the vertical direction. The anamorphic prism system 20 and the beam expander 21 compensate this tilting and maintains the incident light beam to the pentagonal prism 23 always in vertical direction. The light beam irradiated from the pentagonal prism 23 is directed in horizontal direction, and the horizontal reference line is obtained by the irradiated light beam, and the horizontal reference plane is formed by rotating the pentagonal prism 23.

Figure 21:
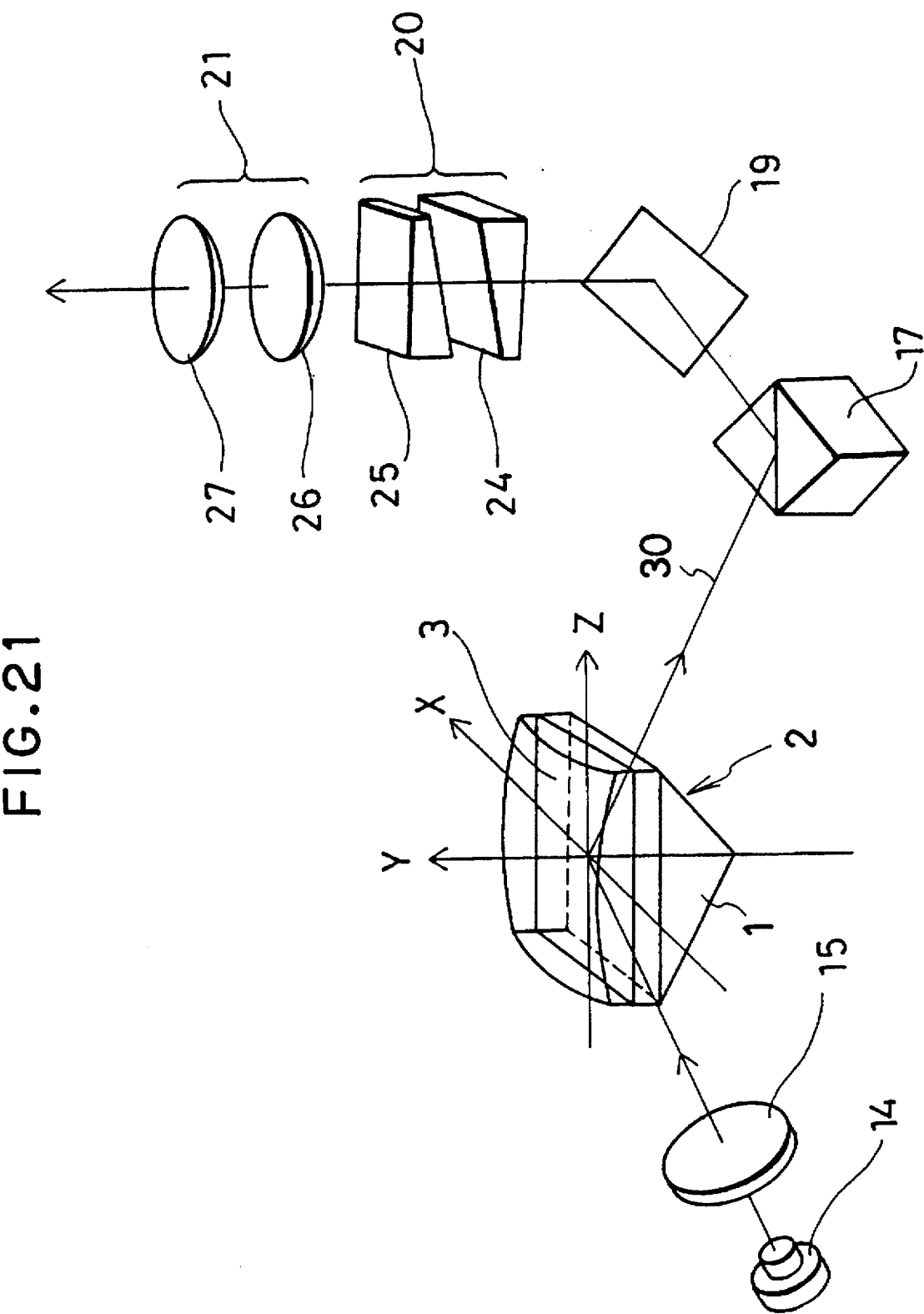
FIG. 21 is a drawing to explain automatic angle compensation when the light is reflected once by free liquid surface.

Description is now given on automatic compensation of the present embodiment, referring to FIGS. 21–27. FIG. 21 is a simplified drawing to schematically illustrate the arrangement of the present embodiment, where the light beam is reflected once by the free liquid surface 3. The same component as in FIG. 1 is referred by the same symbol.

Figure 22:
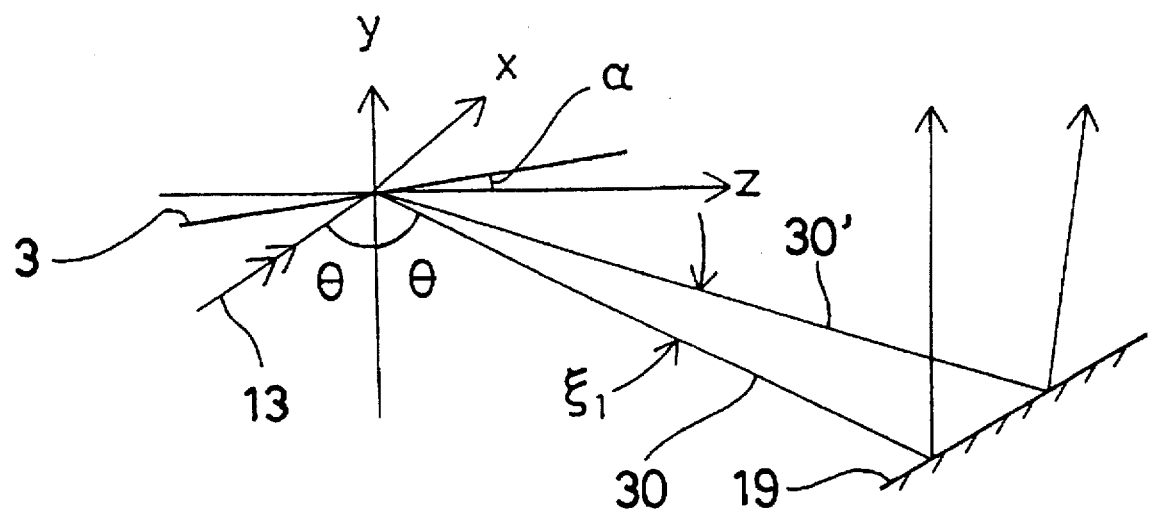
FIG. 22 is a drawing to explain change of reflection angle of a reflection light beam when the free liquid surface is tilted.

In FIG. 22, it is supposed that the incident light beam 13 enters the free liquid surface 3 at an angle θ. It is supposed that x-z coordinate plane formed by coordinate axes x and z is approximately consistent with the free liquid surface 3 and that the coordinate axis perpendicular to the coordinate plane is y. It is also supposed that the optical axis of the incident light beam 13 is present in the coordinate plane formed by the coordinate axes z and y. If the free liquid surface 3 is tilted around the coordinate axis x at an angle α, the optical axis of the reflected light beam 30 moves in the y-z coordinate plane, and the reflection angle is changed by ξ1x in the y-z coordinate plane and is turned to the reflection light beam 30°. In this case, the relationship between the liquid surface displacement angle α and the reflection displacement angle ξ1x is given by: ξ1x=2α, and no reflection displacement angle ξ2x occurs in the x-y coordinate plane. In the figure, reference numeral 19 represents a reflection mirror.

Figure 23:
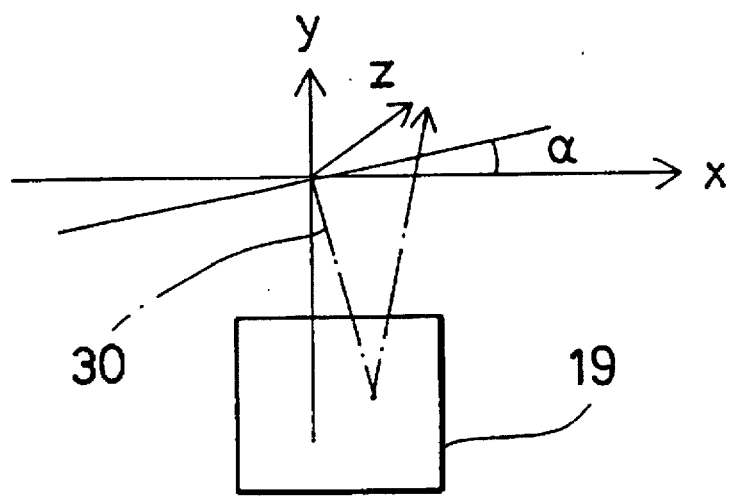
FIG. 23 is a drawing to explain change of reflection angle of a reflection light beam when the free liquid surface is tilted.

In contrast, if the free liquid surface 3 is tilted around the coordinate axis z at an angle α as shown in FIG. 23, the reflection light beam 30 is separated and moved from the x-y coordinate plane and the y-z coordinate plane. Therefore, a reflection displacement angle ξ1z and a reflection displacement angle ξ2z appear on the x-y coordinate plane and the y-z coordinate plane respectively. Further, the relationship between the reflection displacement angle ξ1z and the liquid surface displacement angle α of the free liquid surface 3 is given by:

$$\xi 1z = \cos^{-1}(\cos^2\theta\cos 2\alpha + \sin^2\theta)$$

$$\xi 2z = 90° - \cos^{-1}((1-\cos 2\alpha)\sin\theta\cos\theta) \quad (1)$$

For example, if it is supposed that α=10' and θ=50°, then ξ2z=1.7", and the value of ξ2z is negligible in terms of accuracy. Further, if it is supposed that refractive index of the liquid is n, the optical axis of the light beam after passing through the liquid is given by:

$$\xi 1x' = 2n\alpha$$

$$\xi 1z' = n \cdot \cos^{-1}(\cos^2\theta\cos 2\alpha + \sin^2\theta) \quad (2)$$

Therefore, sensitivity to the liquid surface displacement angle α is different from the cases of the reflection displacement angle ξ1x' and the reflection displacement angle ξ1z'. This difference in sensitivity from the reflection displacement angles ξ1x' and ξ1z' is corrected by optical means to equalize the sensitivity. In so doing, it is possible to obtain an optical axis, which deflects always at a given ratio with respect to all directions.

Further description is given now, referring to FIG. 21.

In the figure, reference numeral 2 represents a liquid sealing container arranged in a main unit of an instrument such as a survey instrument, and a free liquid surface 3 is formed by a liquid 1 sealed in the liquid sealing container 2. To the free liquid surface 3, a light beam emitted from a light source unit 14 is projected at a given angle via a collimator lens 15 to the free liquid surface 3 so that it is totally reflected, and the optical axis of the light beam is positioned within the y-z coordinate plane as described above.

With the free liquid surface 3 not tilted, the reflection light beam 30 totally reflected by the free liquid surface 3 is reflected in vertical direction by a polarized light beam splitter 17 and a second reflection mirror 19, and an anamorphic prism system 20 comprising a pair of wedge-like prisms 24 and 25 is arranged along the optical axis of the reflection light beam 30. The light beam passing through the anamorphic prism system 20 is allowed to pass through a beam expander 21, which comprises convex lenses 26 and 27. If it is assumed that focal length of the convex lens 26 is f3 and focal length of the convex lens 27 is f4, the distance between the convex lenses 26 and 27 is set to: f3+f4.

The anamorphic prism system 20 may be arranged along the optical path before the light beam is reflected by the reflection mirror 19.

In FIG. 21, it is supposed that the preset incident angle θ to the liquid is 50°, tilt angle of the instrument, i.e. tilt angle α of the free liquid surface 3 is 10', and refractive index n of the liquid is 1.4. Then, from the equation (2), the reflection displacement angle ξ1x' when the free liquid surface 3 is tilted around x-axis and the reflection displacement angle ξ1z' when the free liquid surface 3 is tilted around z-axis are obtained respectively as: ξ1x'=28' and ξ1z'=18'. Therefore, the difference of sensitivity between the reflection displacement angle ξ1x' and the reflection displacement angle ξ1z' is (ξ1x'/ξ1z')=1.555. Thus, under this condition:

$$\xi 1x' = 2n\alpha, \quad \xi 1z' = 1.286 n\alpha$$

$$\xi 1x'/\xi 1z' = 1.555 \quad (3)$$

Next, the anamorphic prism system 20 optically corrects the sensitivity difference.

Figure 24:
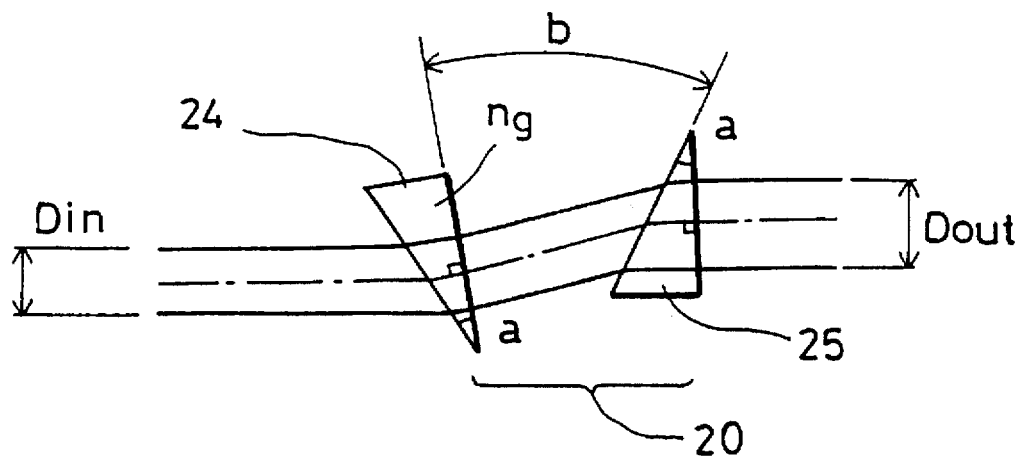
FIG. 24 is a drawing to explain change of optical axis of a transmitted light beam with respect to an anamorphic prism system.
Figure 25A:
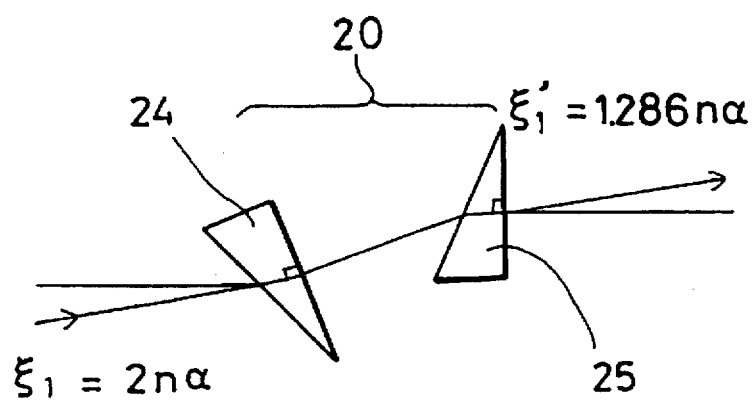
FIG. 25 (A) and FIG. 25 (B) each represents a drawing to explain change of optical axis of a transmitted light beam with respect to an anamorphic prism system.
Figure 25B:
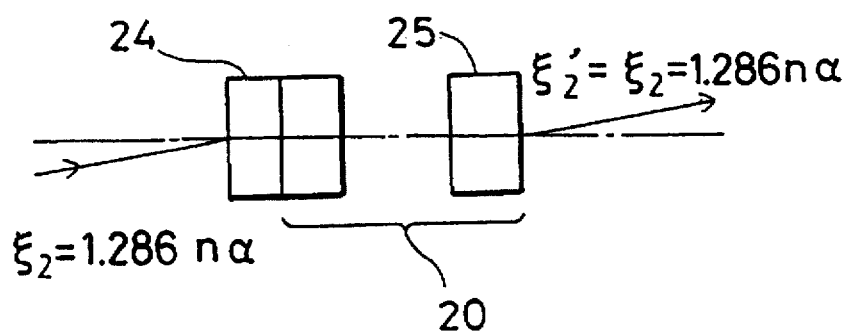

Description is now given on the anamorphic prism system 20 referring to FIGS. 24 and 25.

It is supposed that prism apex angles of the wedge-like prisms 24 and 25, which constitute the anamorphic prism system 20, are a24 and a25, the relative angle of the wedge-like prisms 24 and 25 is b and the refractive index is ng, and that incoming light beam is Din and outgoing light beam is Dout. It is also supposed that the wedge-like prisms 24 and 25 are identical with each other and that apex angle a=a24=a25. Then, $$Magnification\ Map=(Din/Dout)=\cos^2 a/(1-ng^2 \cdot \sin^2 a) \qquad (4)$$

Thus, angular magnification is approximately 1/Map. Therefore, if it is supposed that the prism apex angle is a and the relative angle of the wedge-like prisms 24 and 25 is b and the refractive index ng is selected (e.g. in case ng=1.51, a=27.732° and b=44.793°) so that the relationship:

$$Map=2n\alpha/1.286n\alpha=1.555 \qquad (5)$$

exists, $\xi 1x'$, after passing through the anamorphic prism 20, is converted to: $2n\alpha \times 1.286\ n\alpha/2n\alpha = 1.286\ n\alpha$. After passing through the anamorphic prism system 20, $\xi 1x' = \xi 1z'$.

After passing through the anamorphic prism system 20, the optical axis of the reflection light beam 30 always has uniform reflection displacement angle with respect to the tilting of the free liquid surface 3 in all directions. Thus, even when the free liquid surface 3 is tilted in any direction, the reflection displacement angle of the same sensitivity is always obtained with respect to the tilting.

Further, after the reflection light beam 30 passes the anamorphic prism system 20 and when the light beam reflected upward by the second reflection mirror 19' passes through the beam expander 21, if angular magnification of the beam expander 21 is 1/1.286n, the optical axis after the light beam has passed is tilted by:

$$(\xi 1x' = \xi 1z' = 1.286n\alpha) \times 1/1.286n = \alpha \qquad (6)$$

and final optical axis after passing through the beam expander 21 always runs perpendicularly to the free liquid surface 3, i.e. the optical axis is maintained in vertical direction. If it is supposed that focal length of the convex lens 26, which constitutes the beam expander 21, is f3, and focal length of the convex lens 27 is f4, angular magnification Mex of the beam expander 21 is f3/f4. By selecting the values of f3 and f4, it is possible to have angular magnification of 1/1.286n.

Next, in the arrangement example shown in FIG. 21, the anamorphic prism system 20 may be rotated by 90° and the prism apex angles a24 and a25 of the wedge-like prisms 24 and 25, the relative angle b of the wedge-like prisms 24 and 25, and the refractive index ng may be appropriately selected to obtain M=1/1.555.

The anamorphic prism 20 in the above optical system is generally used for the purpose to turn a beam of oval shape to circular shape. For example, when laser diode is used as light source, cross-sectional shape of the light beam can be made closer to circular shape by the anamorphic prism system 20. (The shape of the beam of laser diode is oval.)

In general, an apparatus or a system where such laser diode is incorporated, often fulfills the function as a laser pointer or a laser marker, and it is desirable that the irradiated shape of the light beam is closer to circular shape. Therefore, it is also very effective for obtaining the beam of circular shape to correct the optical axis by the use of the anamorphic prism system 20.

As described above, the difference of sensitivity of the reflection displacement angle $\xi 1x'$ and the reflection displacement angle $\xi 1z'$ with respect to the liquid displacement angle is corrected by the optical means to equalize the sensitivity. As a result, it is possible to obtain an optical axis, which is always deflected at a constant rate in all directions.

Next, referring to FIGS. 26 and 27, description will be given on the difference of sensitivity of the changes of reflection angle between the following two cases, i.e. between the case where the light beam is irradiated into the free liquid surface at a given angle and is totally reflected by the free liquid surface, and the emitted light beam is reflected by a mirror and is again irradiated into the free liquid surface and is totally reflected by the free liquid surface, and the case where the light beam is totally reflected twice by the free liquid surface with respect to the tilting direction of the liquid surface when the free liquid surface is relatively tilted with respect to the light beam.

Description is given on the case where the incident light beam coming from the beam splitter 17 enters the free liquid surface 3 at an angle of $\theta$, is totally reflected by the free liquid surface 3 and is reflected by the first reflection mirror 6. Then, it enters the free liquid surface 3, is totally reflected by the free liquid surface 3, passes through the beam splitter 17 and is reflected by the mirror 19.

It is supposed that the free liquid surface 3 is approximately consistent with the x-z coordinate plane formed by the coordinate axes x and z and that the coordinate axis perpendicular to the coordinate plane is y. It is also supposed that the optical axis of the incident light beam is present in the coordinate plane formed by the coordinate axes z and y. If the free liquid surface 3 is tilted around the coordinate axis x at an angle of $\alpha$ from this condition, the optical axis of the reflected light beam 30 moves in the y-z coordinate plane, and the reflection angle is changed by $\xi 1x$ within the y-z coordinate plane. In this case, the relationship between the liquid surface displacement angle $\alpha$ and the reflection displacement angle $\xi 1x$ is given by: $\xi 1x = 4\alpha$, and no reflection displacement angle $\xi 2x$ occurs in the x-y coordinate plane in this case.

Figure 27:
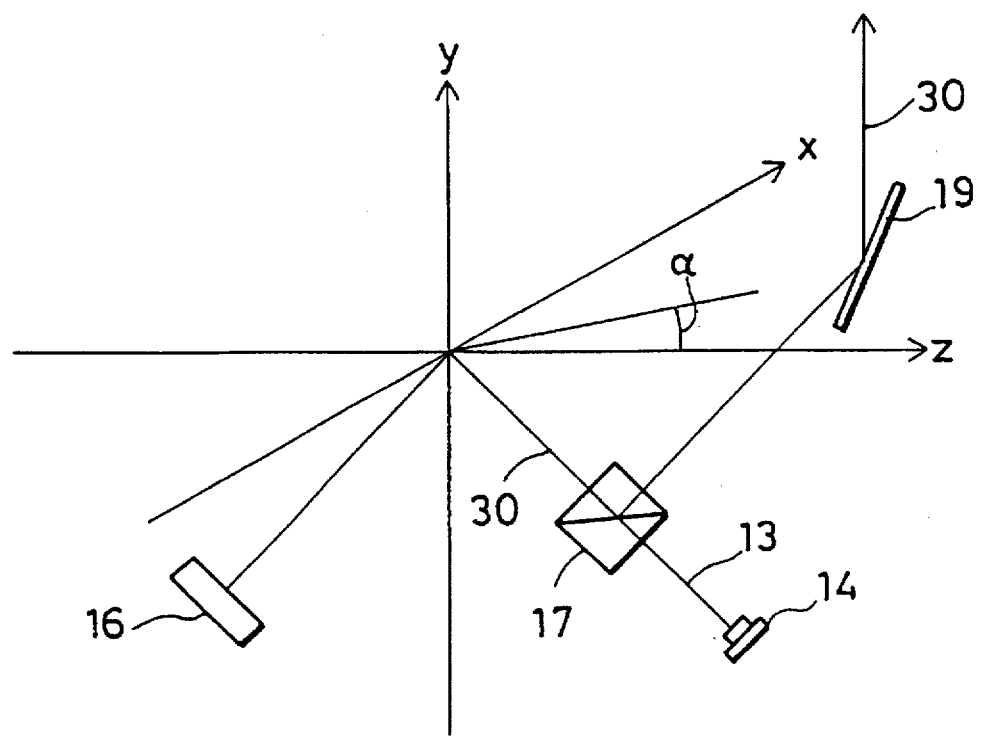
FIG. 27 is a drawing to explain change of a reflection angle of a reflected light beam when the free liquid surface is tilted in ease it is reflected twice by the free liquid surface.

In contrast, if the free liquid surface 3 is tilted around the coordinate axis z at an angle $\alpha$ as shown in FIG. 27, the reflection light beam 30 is separated and moved from the x-y coordinate plane and the y-z coordinate plane respectively. Accordingly, the reflection displacement angle $\xi 1z$ and the reflection displacement angle $\xi 2z$ appear on the x-y coordinate plane and the y-z coordinate plane. Further, the relationship between the reflection displacement angle $\xi 1z$ and the liquid surface displacement angle $\alpha$ of the free liquid surface 3 is given by:

$$\xi 1z = \cos^{-1}\{\cos 2\alpha \cdot \sin^2 2\theta - \cos 2\theta \cdot \sin^2 \theta - (\sin^2 2\alpha - \cos^2 2\alpha \cdot \cos 2\theta)\cos^2 \theta\}$$

$$\xi 2z = \pi/2 - \cos^{-1}\left[\{½(\sin^2 2\alpha - \cos^2 2\alpha \cdot \cos 2\theta - \cos 2\theta) + \cos 2\alpha \cdot \cos 2\theta\}\sin 2\theta\right] \qquad (7)$$

For example, if $\alpha=10'$ and $\theta=50°$, then $\xi 2z=3.43"$, and the value of $\xi 2z$ is negligible in terms of accuracy. Further, if it is supposed that refractive index of the liquid is n, the optical axis after the light beam has passed through the liquid is given by:

$$\xi 1x' = n\xi 1x$$

$$\xi 1z' = n\xi 1z \qquad (8)$$

More concretely, if it is supposed that $\alpha=10'$, $\theta=50°$ and n=1.4, then:

$$\xi 1x' = 56'$$

$$\xi 1z' = 35.994'$$

$$\xi 1x'/\xi 1z'=1.555 \qquad (9)$$

In this way, under the condition that θ=50°, the difference of sensitivity to the liquid displacement angle α with respect to the reflection displacement angle ξ1x' and the reflection displacement angle ξ1z' is the same as the case where the light beam is reflected once by the free liquid surface 3. Therefore, the anamorphic prism system 20 can be used, which always provides the reflection displacement angle of the same sensitivity to the tilting.

Here, the magnification Map of the anamorphic prism system 20 is expressed as:

$$Map=4n\alpha/2.572n\alpha=1.555$$

$$1/Map=\gamma ap=1/1.555=0.64309 \qquad (10)$$

Therefore, after the light beam passes through the anamorphic prism system 20, correction is made as:

$$\xi 1x'=4n\alpha \times 1/1.555=2.572n\alpha$$

$$\xi 1z'=2.572n\alpha \qquad (11)$$

Further, if it is supposed that n=1.4, the magnification Mex of the beam expander 21 to maintain the optical axis in vertical direction after the light beam has passed through the anamorphic prism system 20 is given as:

$$Mex=2.572n\alpha/\alpha=2.572n=3.601$$

$$\gamma ex=1/Mex=1/2.572n=0.278 \qquad (12)$$

As described above, the difference of sensitivity between the reflection displacement angle ξ1x' and the reflection displacement angle ξ1z' with respect to the liquid displacement angle is corrected by the optical means to equalize the sensitivity. As a result, it is possible to obtain an optical axis, which always deflects at a constant rate in all directions.

As already described, the anamorphic prism system 20 equalizes the reflection sensitivity in all directions and the beam expander 21 ultimately adjusts the sensitivity. Accordingly, after passing through the beam expander 21, the optical axis of the light beam is always compensated in vertical direction regardless of the tilting of the entire system. Therefore, the light beam emitted from the pentagonal prism 23 is directed in horizontal direction, and a constant horizontal reference plane can be always obtained by rotating the pentagonal prism 23. In other words, the present invention can be applied to a leveling instrument.

Figure 2:
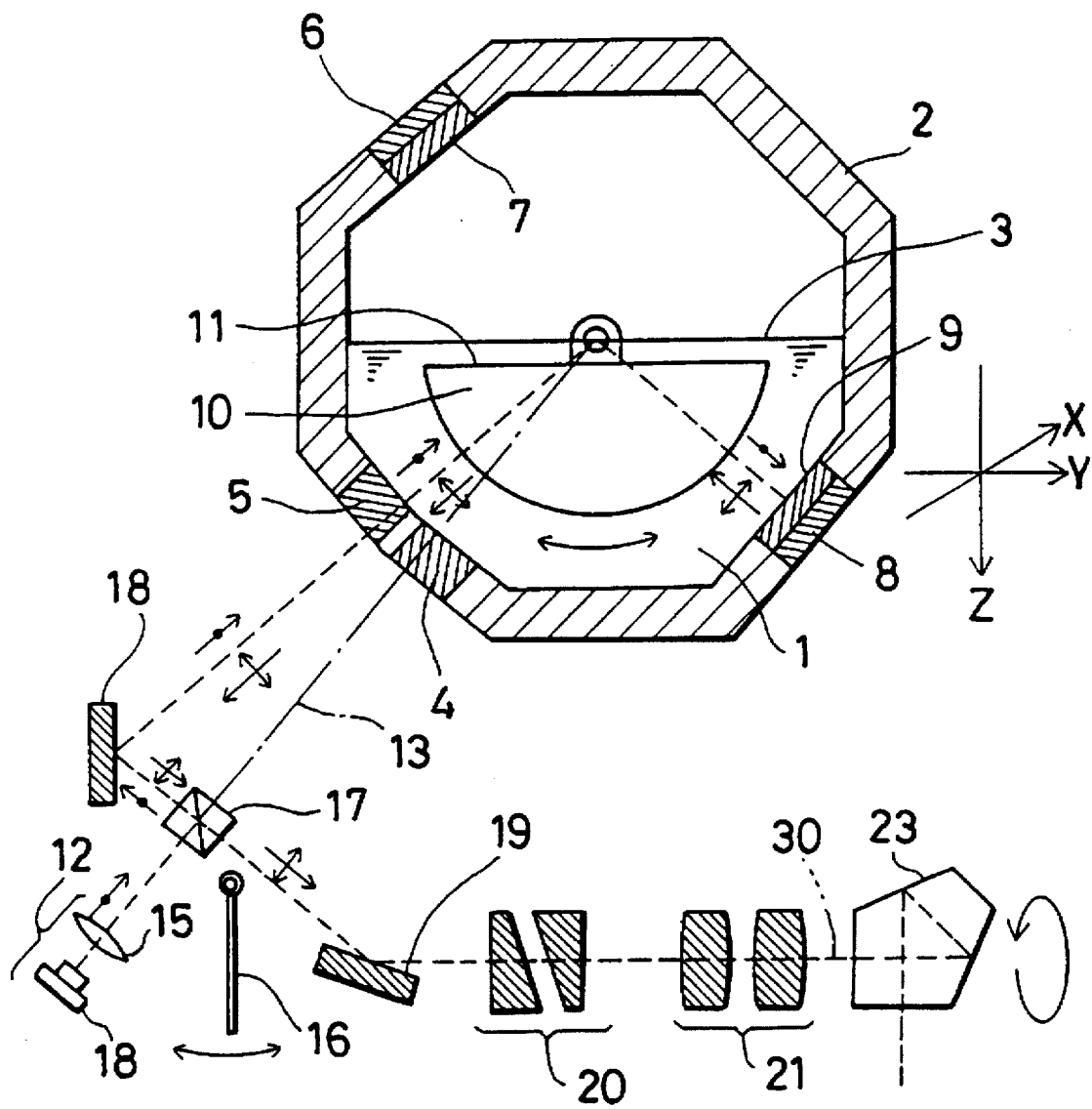
FIG. 2 shows the first embodiment of the present invention turned down by 90°.

Next, FIG. 2 represents the entire arrangement of the present embodiment turned down by 90°.

The liquid movement preventing device 10 is rotated by 90° so that the liquid movement preventing plate 11 is held in horizontal position by the gravitational force. Because the free liquid surface 3 of the transparent liquid 1 is always held in horizontal direction with respect to the center of gravity, it is rotated by 90°, following the rotation by 90° of the entire system.

Similarly, the λ/2 phase plate 16 is also rotated by 90°, and it is deviated from the light beam 13 by this rotation. As a result, the light beam entering the polarized light beam splitter 17 has linearly polarized light perpendicular to the paper surface, and it is reflected by the polarized light beam splitter 17 and is further reflected by the first reflection mirror 18. Then, it enters the liquid sealing container 2 through the second entry/exit window 5, passes through the transparent liquid 1 and the liquid movement preventing device 10 and is reflected by the free liquid surface 3. After being reflected by the free liquid surface 3, the light beam is reflected by the second reflection mirror 8. Because the second reflection mirror 8 is provided with a λ/4 phase plate 9, the reflection light beam 30 passes through the λ/4 phase plate 9 twice. As a result, the direction of polarization is converted, and it runs in parallel to the paper surface. The reflection light beam 30 reflected by the second reflection mirror 8 is reflected by the free liquid surface 3, passes through the liquid movement preventing device 10 and is emitted through the second entry/exit window 5. The second reflection mirror 8 serves as a second light irradiating means for irradiating the light beam again, which has entered the liquid sealing container 2.

After being emitted through the second entry/exit window 5, the reflection light beam 30 is reflected by the first reflection mirror 18, passes through the polarized light beam splitter 17 and is reflected in horizontal direction by the second reflection mirror 19. By passing through the anamorphic prism system 20 and the beam expander 21, the reflection light beam 30 emitted from the beam expander 21 is always maintained in horizontal direction regardless of the tilting of the entire system, and the plane formed by light beam rotated and irradiated by the pentagonal prism 23 always provides a constant vertical reference plane.

Also, it is possible to achieve automatic angle compensation at horizontal position or at vertical position.

Figure 3:
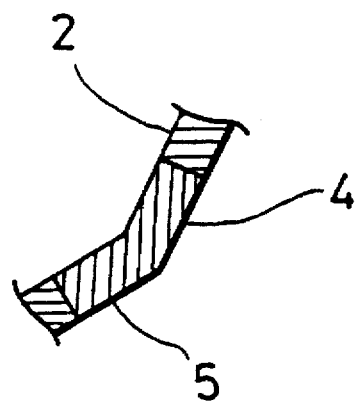
FIG. 3 is an enlarged partial view of another example of a first entry/exit window or a second entry/exit window of the first embodiment of the present invention.

The first entry/exit window 4 and the second entry/exit window 5 are separately provided in the above, but they may be integrated as shown in FIG. 3. The polarized light beam splitter 17 may be another optical path dividing means such as a half-mirror. If a half-mirror is used, there is no need to use the λ/2 phase plate 16.

The transparent liquid 1 sealed in the liquid sealing container 2 is moved by external vibration, while this liquid movement is suppressed by the liquid movement preventing device 10.

Figure 4:
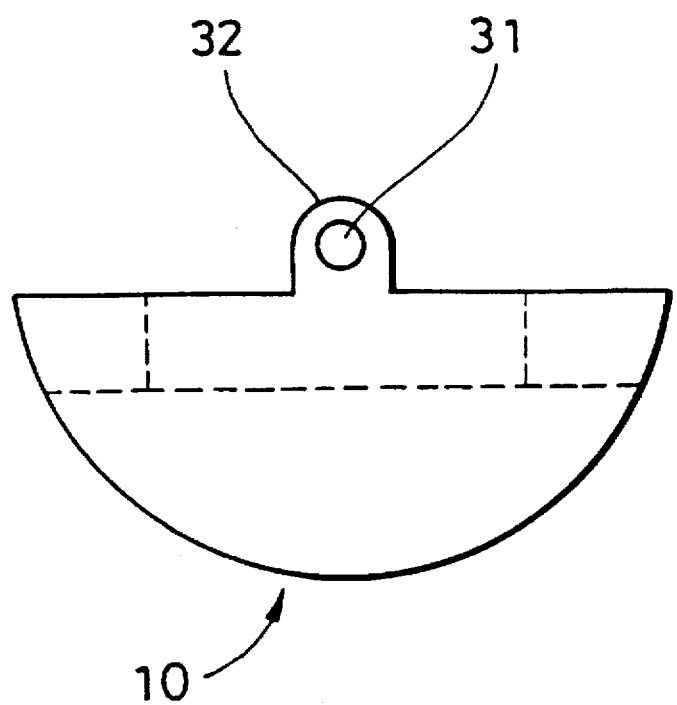
FIG. 4 is a front view of a liquid movement preventing device used in the present invention.
Figure 5:
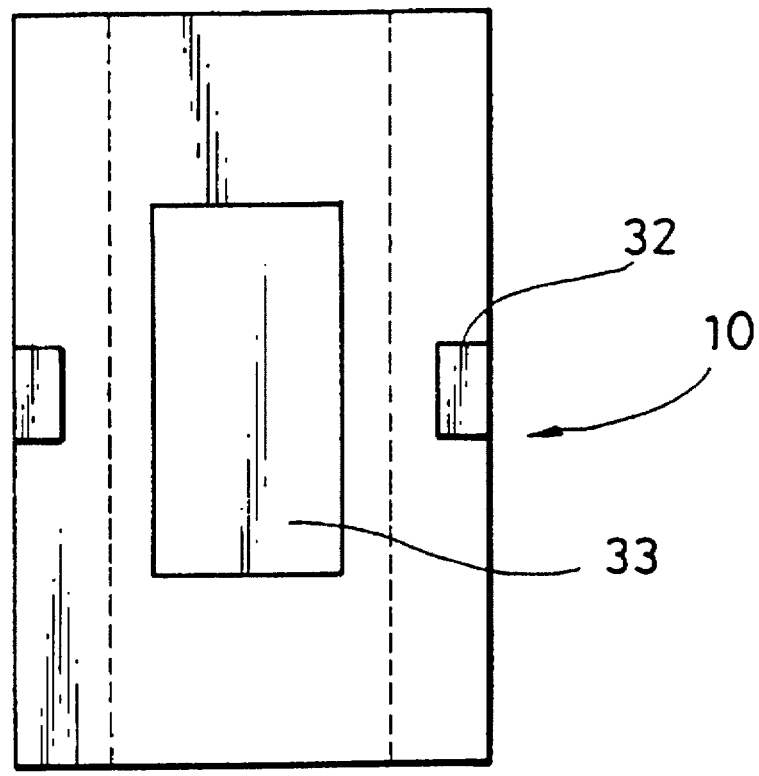
FIG. 5 represents a plan view of the liquid movement preventing device.
Figure 6:
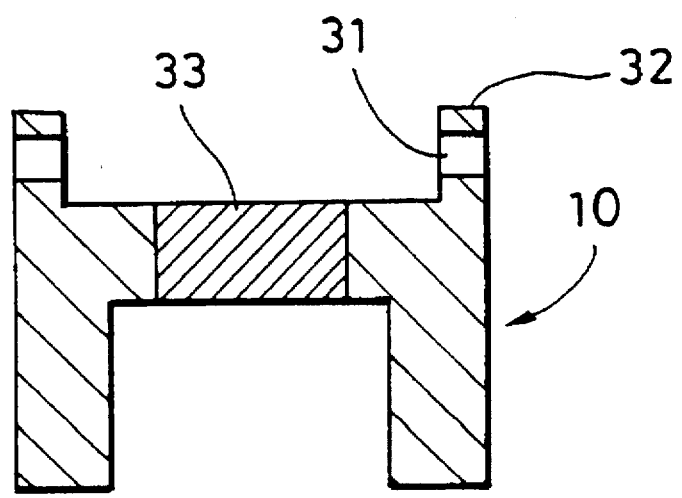
FIG. 6 is a side cross-sectional view of the liquid movement preventing device.

Referring to FIGS. 4 to 6, the liquid movement preventing device 10 will be described.

The liquid movement preventing device 10 has a projection 32 comprising a shaft hole 31, and the projection 32 is movably engaged with a pendulum shaft (not shown) provided on the liquid sealing container 2. The pendulum shaft is arranged at a position, which is approximately consistent with the portion of the free liquid surface 3 to reflect the light beam 13, and the liquid movement preventing device 10 is movable around this reflecting portion.

The liquid movement preventing device 10 is designed in semi-circular shape with flat top surface and has a cross-section concaved upward. At the center of the top surface, a rectangular transparent plate to allow the light beam to pass, in particular, a transparent glass 33 not to attenuate the light, is set. The upper surface of the liquid movement preventing device 10 is positioned slightly below the free liquid surface 3, and the center of gravity is set at such position that the device is always maintained in horizontal direction.

If a natural frequency of the liquid movement preventing device 10 is lower than a natural frequency of the transparent liquid 1 sealed in the liquid sealing container 2, the movement of the free liquid surface 3 is reduced due to viscosity of the liquid and resistance of the liquid movement preventing device 10. If the center of movement in the liquid movement preventing device 10 is at the portion of the free liquid surface 3 to reflect the light beam, the same condition can be maintained when the liquid sealing container 2 is rotated by 90°, and when the light beam enters from the opposite direction as described above, the light beam is reflected in the same direction.

A material having high thermal conductivity, e.g. copper material, is used for the liquid movement preventing device 10, and it is designed with large surface area. As a result, it promotes heat transmission toward the interior of the liquid when sudden change occurs in environmental temperature and this prevents the change in distribution of refractive indices and increases the stability of the light beam.

Figure 7:
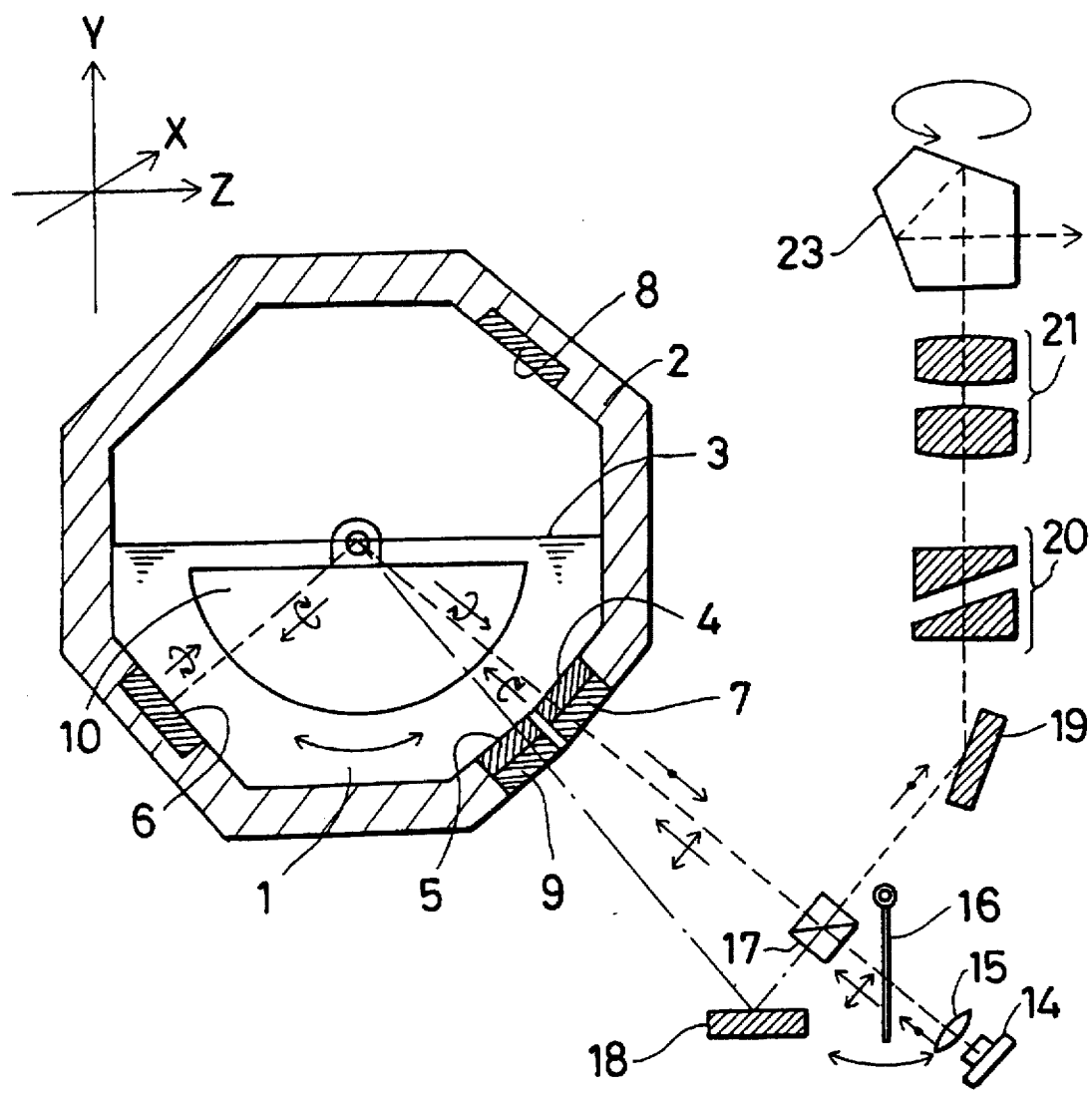
FIG. 7 is a drawing to explain a second embodiment of the present invention.

Description is given now on a second embodiment of the invention referring to FIG. 7.

In FIG. 7, the same component as in FIGS. 1 and 2 is referred by the same symbol, and detailed description is not given here.

In the first embodiment described above, the λ/4 phase plate 7 and the λ/4 phase plate 9 are provided on reflection surfaces of the first reflection mirror 6 and the second reflection mirror 8. In the second embodiment, the λ/4 phase plate 7 is closely fitted to the first entry/exit window 4, and the λ/4 phase plate 9 is closely fitted to the second entry/exit window 5.

In this embodiment, too, the light beam entering the free liquid surface 3 and the light beam reflected by the free liquid surface 3 pass through the first entry/exit window 4 and the second entry/exit window 5 twice, i.e. pass through the λ/4 phase plates 7 and 9 twice even when the entire system is in the condition shown in FIG. 7 or when the entire system is tilted by 90°. Therefore, the direction of polarization is changed by 90°. Similarly to the first embodiment, a horizontal reference plane and a vertical reference plane are formed by the light beam emitted from the pentagonal prism 23 regardless of the tilting of the entire system, and angle compensation can be achieved when the automatic angle compensator is at horizontal position or at vertical position.

Figure 8:
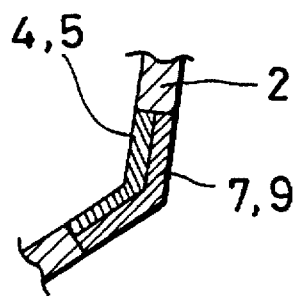
FIG. 8 is an enlarged partial view of another example of a first entry/exit window or a second entry/exit window of the second embodiment of the present invention.

As shown in FIG. 8, the first and the second entry/exit windows 4 and 5 and the λ/4 phase plates 7 and 9 may be put together integrally.

Figure 9:
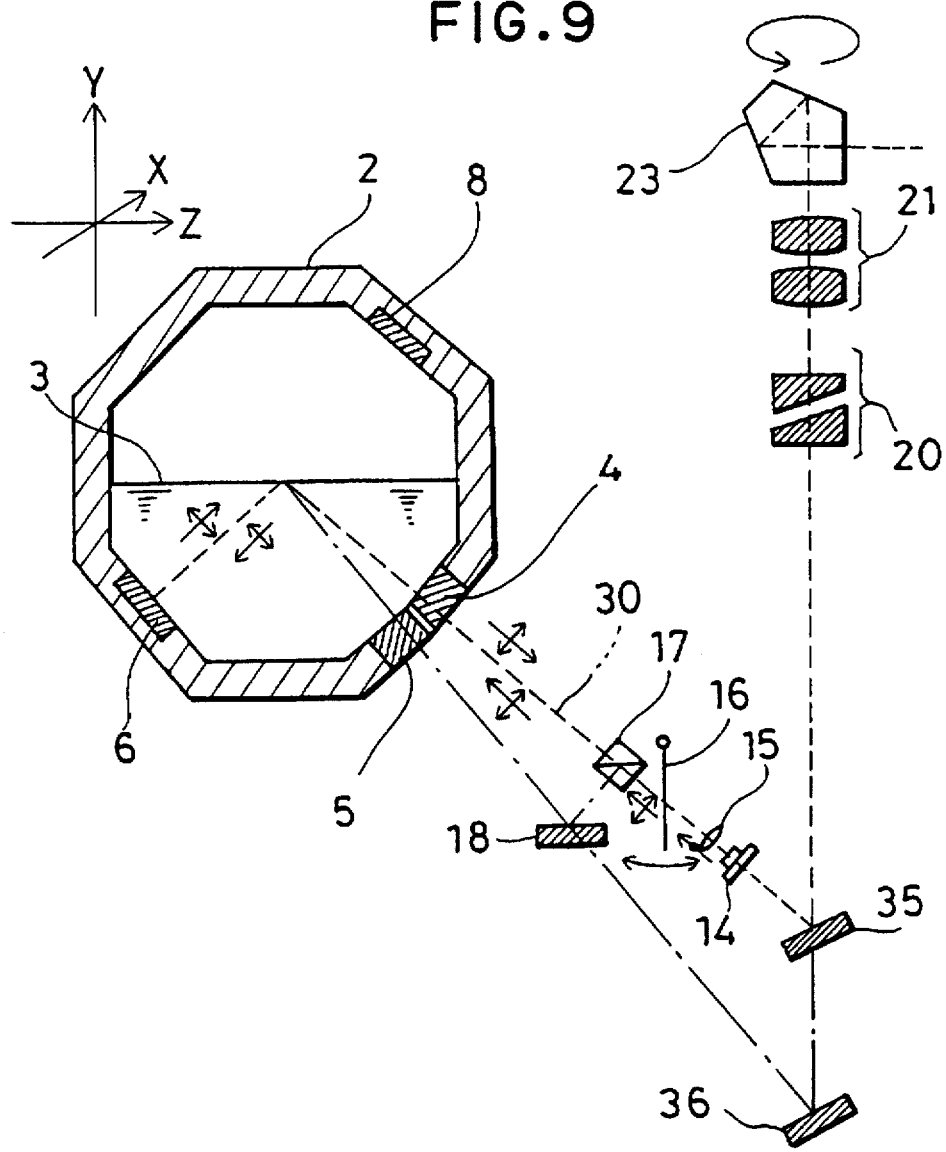
FIG. 9 is a drawing to explain a third embodiment of the present invention.
Figure 10:
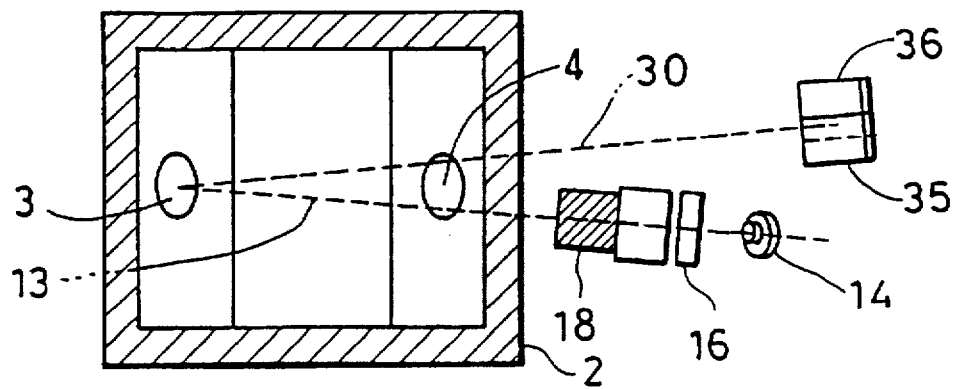
FIG. 10 is a plan view of the third embodiment of the present invention.

FIG. 9 and FIG. 10 each represents a third embodiment of the present invention.

In FIGS. 9 and 10, the same component as in FIGS. 1 and 2 is referred by the same symbol, and detailed description is not given here.

In this embodiment, the light beam is irradiated to the free liquid surface 3 at an angle in vertical direction with respect to the paper surface in FIG. 9, and the incident optical axis and the reflected optical axis are deviated in a direction perpendicular to the paper surface in FIG. 9 (See FIG. 10.).

Behind the light source unit 14 and along the reflection optical axis, a fourth reflection mirror 35 is arranged, and a fifth reflection mirror 36 is disposed behind the first reflection mirror 18 and along the reflection optical axis. Also, the liquid movement preventing device 10 is not shown in FIGS. 9 and 10, and the λ/4 phase plates 7 and 9 used in the first embodiment are not used.

In the following, description will be given on the operation of the third embodiment.

The light beam 13 emitted from the light source unit 14 passes through the λ/2 phase plate 16 and is turned to linearly polarized light beam in parallel to the paper surface. As described above, the polarized light beam splitter 17 allows the linearly polarized light in parallel to the paper surface to pass. Thus, the light beam coming from the light source unit 14 passes through the polarized light beam splitter 17 and enters the transparent liquid 1 via the first entry/exit window 4 and is reflected by the free liquid surface 3 toward the first reflection mirror 6.

The reflection light beam 30 is irradiated to the first reflection mirror 6 at a given angle and is reflected. Then, it passes along an optical axis different from that of the incident light beam 13 and is reflected by the free liquid surface 3. The reflection light beam 30 is irradiated from the first entry/exit window 4 and is deviated from the polarized light beam splitter 17 and reaches the fourth reflection mirror 35 and is reflected by the fourth reflection mirror 35 in vertical direction. After being reflected by the fourth reflection mirror 35, the reflection light beam 30 passes through the anamorphic prism system 20 and the beam expander 21 and is emitted in horizontal direction from the pentagonal prism 23.

The light beam emitted from the pentagonal prism 23 is directed in horizontal direction, and the horizontal reference plane can be obtained by the emitted light beam. By rotating the pentagonal prism 23, the horizontal reference plane is formed by the light beam.

Figure 11:
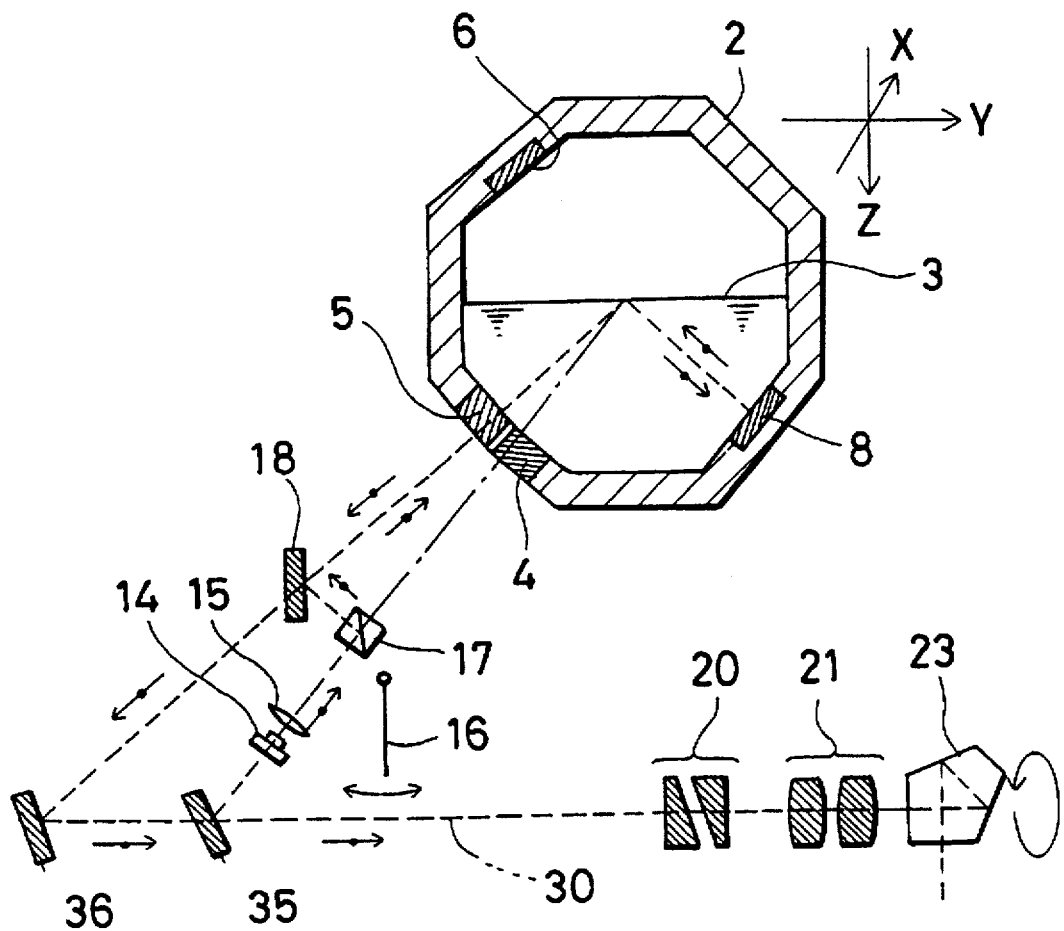
FIG. 11 represents the third embodiment turned down by 90°.
Figure 12:
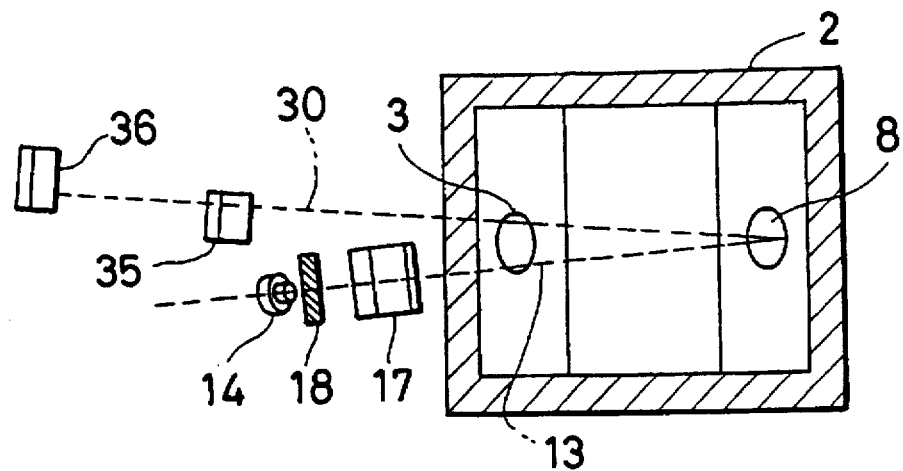
FIG. 12 is a plan view of the third embodiment turned down by 90°.

FIGS. 11 and 12 each represents the case where the entire system is rotated by 90°.

The λ/2 phase plate 16 is rotated by 90°, and the λ/2 phase plate 16 is deviated from the light beam 13 due to this rotation. Therefore, the light beam entering the polarized light beam splitter 17 has linearly polarized light perpendicular to the paper surface. It is reflected by the polarized beam splitter 17 and is then reflected by the first reflection mirror 18 and enters the liquid sealing container 2 via the second entry/exit window 5. Then, it passes through the transparent liquid 1 and is reflected by the free liquid surface 3. After being reflected by the free liquid surface 3, it is reflected by the second reflection mirror 8.

The reflection light beam 30 reflected by the second reflection mirror 8 is deviated in a direction perpendicular to the paper surface from the optical axis of the incident light beam. It is further reflected by the free liquid surface 3 and is emitted from the second entry/exit window 5. The reflection light beam 30 emitted from the second entry/exit window 5 is deviated from the first reflection mirror 18 and reaches the fifth reflection mirror 36 and is reflected in horizontal direction by the fifth reflection mirror 36.

Because the fourth reflection mirror 35 and the fifth reflection mirror 36 are deviated in a direction perpendicular to the paper surface in FIG. 11, the reflection light beam 30 reflected by the fifth reflection mirror 36 is not shielded by the fourth reflection mirror 35.

After passing through the anamorphic prism system 20 and the beam expander 21, the reflection light beam 30 emitted from the beam expander 21 is always maintained in horizontal direction regardless of the tilting of the entire system, and the plane formed by light beam which is rotated and irradiated from the pentagonal prism 23 always forms a constant vertical reference plane.

Also, in the third embodiment, angle compensation can be achieved when the automatic angle compensator is at horizontal position or at vertical position. In the third embodiment, the route of an outward trip of the light beam is different from its route on a return trip, and it does not pass through the polarized light beam splitter 17 on the return trip, and this prevents attenuation of the light.

Next, description will be given on an embodiment of a tilt angle detector, which detects tilt angle using the automatic tilt angle compensator of the present invention in connection with FIGS. 13 and 14.

In this embodiment, the same component as in FIG. 1 is referred by the same symbol and the detailed description is not given here.

In the present embodiment, the pentagonal prism 23 of the automatic tilt angle compensator shown in FIG. 1 is not used, and a photodetector 38 is arranged instead, and a condenser lens 41 for forming an image on light receiving surface of the photodetector 38 is disposed so that the reflection light beam 30 emitted from the anamorphic prism system 20 can be received by the photodetector 38.

Figure 15:
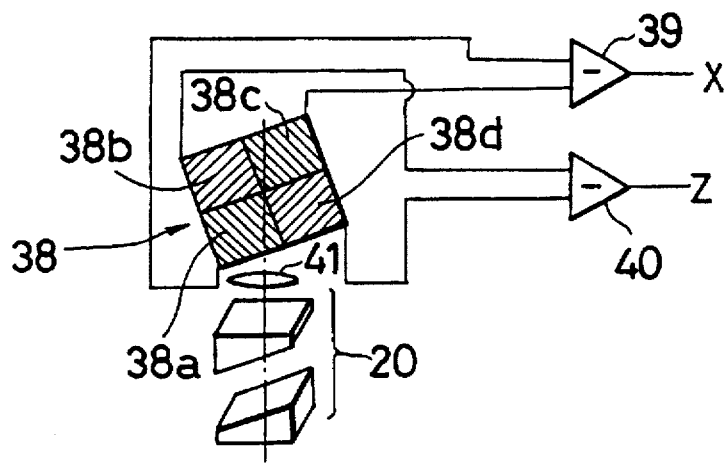
FIG. 15 is a drawing to explain an angle detecting unit of the tilt angle detector.

As shown in FIG. 15, the photodetector 38 has its light receiving surface divided into light receiving sections 38a, 38b, 38c and 38d around the optical axis. The light receiving sections 38a and 38c are arranged in x-axis direction, and the light receiving sections 38b and 38d are arranged in z-axis direction.

Outputs from the light receiving sections 38a and 38c are inputted to a comparative amplifier 39, and outputs from the light receiving sections 38b and 38d are inputted to a comparative amplifier 40. Outputs from the comparative amplifiers 39 and 40 are inputted to a computing unit (not shown). From the outputs of the two amplifiers, irradiated position of the reflection light beam 30 is detected, and tilt angle of the liquid surface of the free liquid surface 3 and the tilt angle of the entire system are calculated.

A device such as CCD is used as light receiving element, and coordinate axes of the irradiated position on the photodetector 38 are obtained to calculate the tilt angle.

Figure 13:
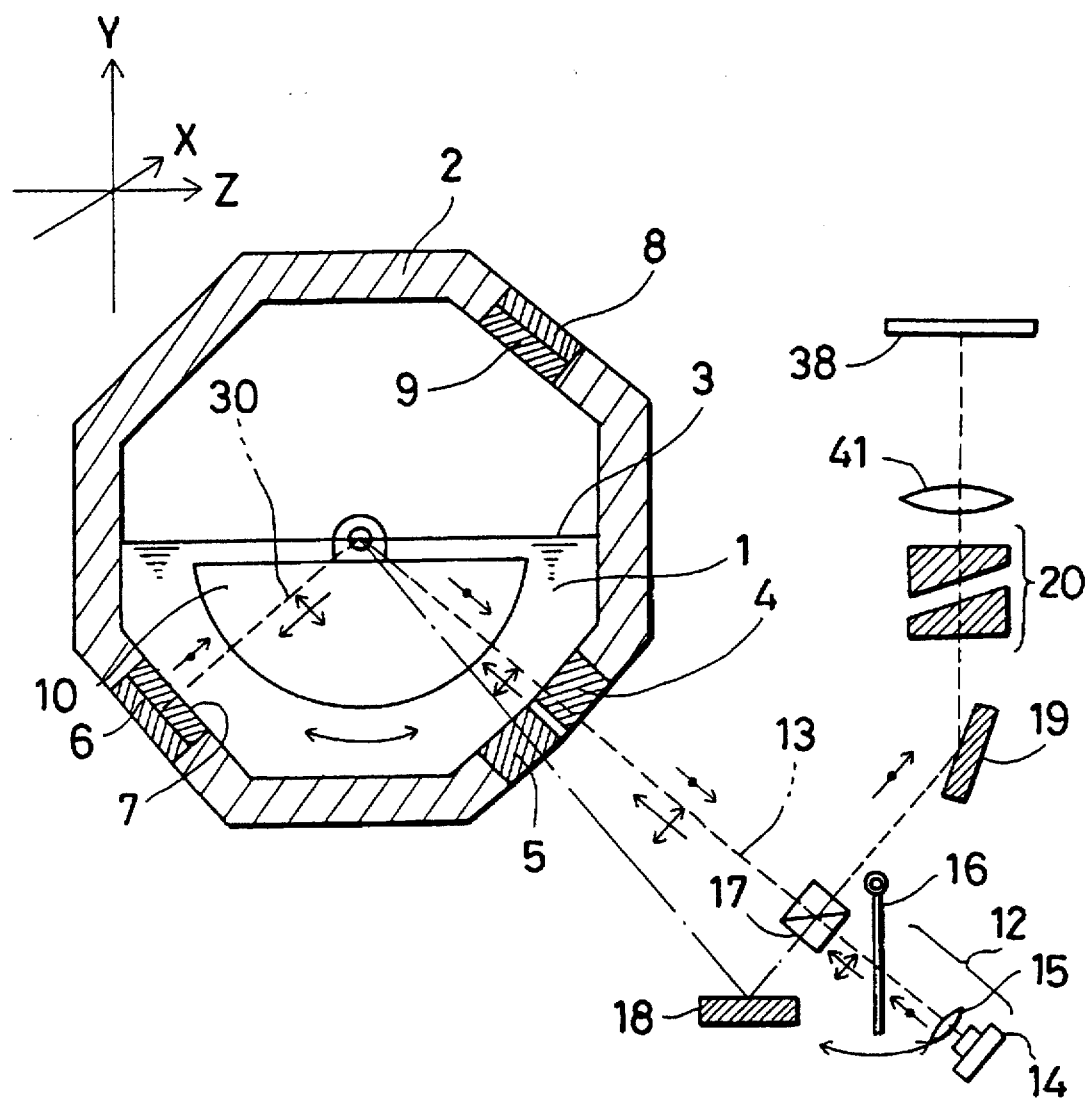
FIG. 13 represents a tilt angle detector, in which the compensator of the present invention is applied.
Figure 26:
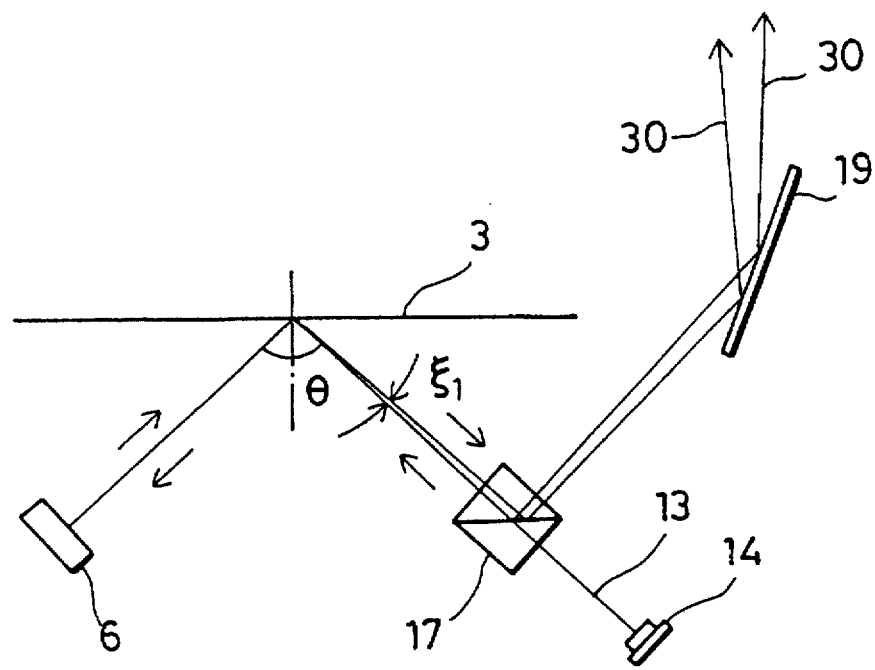
FIG. 26 is a drawing to explain change of reflection angle of a reflected light beam in case it is reflected twice by the free liquid surface.

When the free liquid surface 3 is tilted in FIG. 13, a displacement angle corresponding to the tilting of the free liquid surface 3 appears on the optical axis of the reflection light beam 30 as explained referring to FIG. 26, and the optical axis is moved. Also, the anamorphic prism system 20 corrects sensitivity of displacement angle to the tilting of the free liquid surface 3 in all directions. Therefore, the irradiated position of the reflection light beam 30 on the light receiving surface of the photodetector 38 moves to a position, which matches the tilting of the free liquid surface 3. Thus, the tilt angle of the entire system can be detected according to the output from the photodetector 38 without correcting the output of the photodetector 38.

When a device such as CCD is used as the light receiving element and tilt angle is calculated by obtaining coordinate axes of irradiation position on the photodetector 38, if it is supposed that the distance between the photodetector 38 and the condenser lens 41 is f and that the angle between the optical axis of the reflection light beam 30 entering the condenser lens 41 and the optical axis of the condenser lens 41 is θ, the displacement on the light receiving surface of the photodetector 38 can be given by f tan θ, and this displacement f tan θ can be detected from the signal of the photodetector 38. Therefore, the angle θ, which depends upon the free liquid surface 3, can be reversely calculated from the displacement f tan θ.

Figure 14:
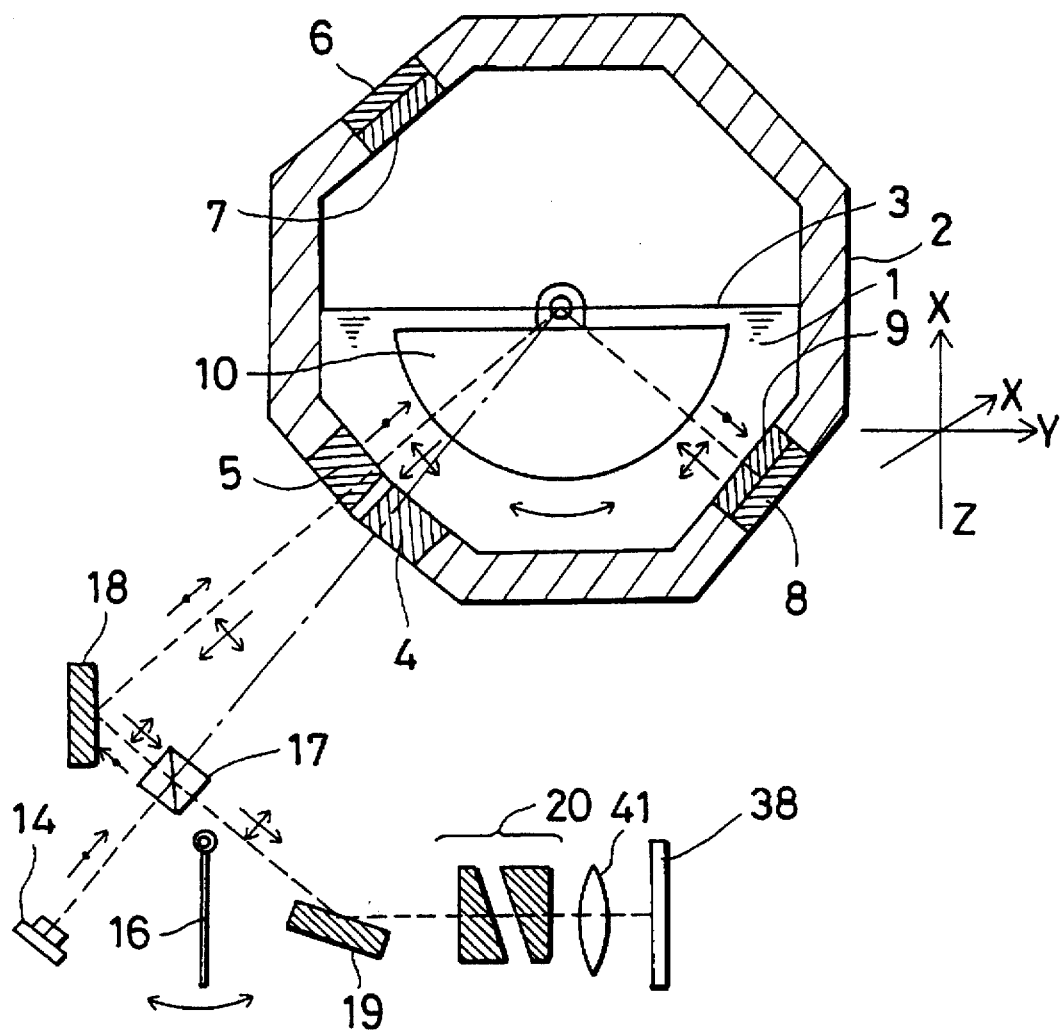
FIG. 14 represents the tilt angle detector turned down by 90°.

FIG. 14 represents the present embodiment with the entire system turned down by 90°.

The operation of this embodiment shown in FIG. 14 is the same as that of FIG. 2 in that the reflection light beam 30 is emitted from the anamorphic prism system 20, and detailed description is not given here.

Therefore, it is possible to detect tilt angle of the entire system near 0° and 90° when the entire system is turned down by 0° and the entire system is turned down by 90°.

The anamorphic prism system 20 may not be used, and electrical correction may be made so that sensitivity of output from the photodetector 38 is equalized in all directions. The polarized light beam splitter 17 may be another optical dividing means such as a half-mirror. If a half-mirror is used, there is no need to use the λ/2 phase plate 16.

Figure 16:
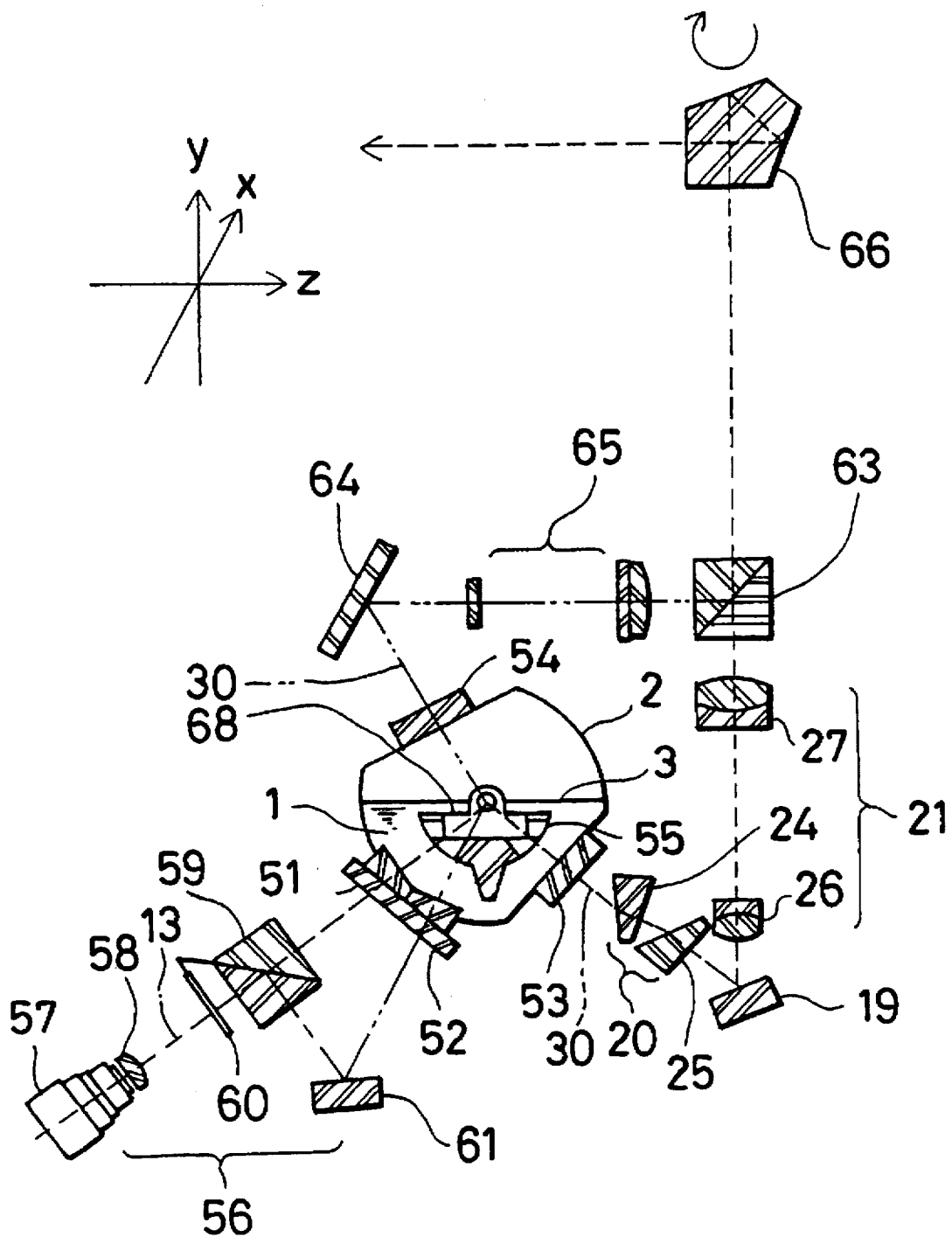
FIG. 16 represents an arrangement of a fourth embodiment of the present invention.
Figure 17:
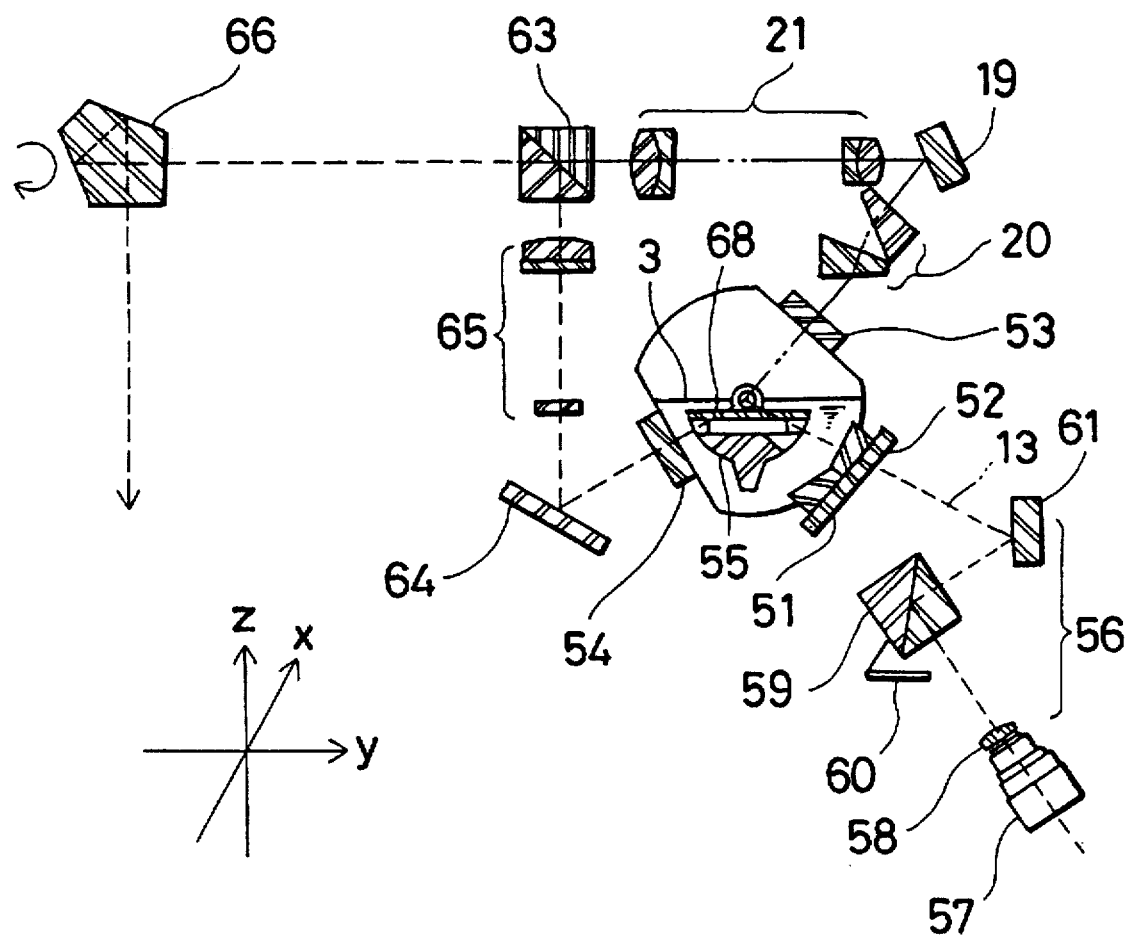
FIG. 17 represents the fourth embodiment turned down by 90°.

Description is now given on a fourth embodiment referring to FIGS. 16 and 17.

In the fourth embodiment, the light beam is reflected once by the free liquid surface.

On lower side of the liquid sealing container 2, in which the transparent liquid 1 to form the free liquid surface 3 is sealed, a first entry window 51 serving as a first light entry means to guide the light beam toward the transparent liquid 1 and a second entry window 52 serving as a second light irradiating means are arranged adjacent to each other. A first emitting window 53 serving as a first light irradiating means for irradiating the reflection light beam reflected by the free liquid surface to outside the liquid sealing container 2 and a second emitting window 54 serving as a second light irradiating means are arranged on the liquid sealing container 2. The first emitting window 53 is arranged on the side of the second entry window 52, and the second emitting window 54 is disposed on the side of the first entry window 51.

Inside the liquid sealing container 2, a liquid movement preventing device 55 is rotatably arranged by immersing into the transparent liquid 1, and axis of rotation of the liquid movement preventing device 55 is consistent or nearly consistent with the free liquid surface 3. As described later, the liquid movement preventing device 55 has a transparent liquid movement preventing plate 68 at a position somewhat below the free liquid surface 3 of the transparent liquid 1, and the center of gravity of the liquid movement preventing device 55 is located at such position that the liquid movement preventing plate 68 is always kept at horizontal position.

A light projecting system 56 is arranged opposite to the first entry window 51 and the second entry window 52. The light projecting system 56 comprises a light source unit 57, a collimator lens 58, and a polarized light beam splitter 59 arranged sequentially toward the first entry window 51. A ½ wave plate 60 of birefringence member is rotatably mounted between the polarized light beam splitter 59 and the collimator lens 58. When y-axis of the entire system is directed in vertical direction as shown in FIG. 16, the ½ wave plate 60 traverses the light beam from the light source unit 57, and when z-axis of the entire system is directed in vertical direction as shown in FIG. 17, the center of gravity is eccentrically deviated from the center of rotation so that it is deviated from the optical path of the light beam.

A semiconductor laser having approximately linearly polarized light is used as the light source in the light source unit 57, and the direction of polarization is set in such manner that the light beam is turned to linearly polarized light vibrating in parallel to x-axis shown in FIG. 16. The plane of polarization of the ½ wave plate 60 is set in such manner that the direction of axis is rotated by 90° and runs in parallel to y-axis when the incident light beam 13 from the light source unit 57 passes through the ½ wave plate 60.

A reflection mirror 61 is arranged opposite to the polarized light beam splitter 59, and the reflection mirror 61 reflects the light beam reflected by the polarized light beam splitter 59 toward the second entry window 52. The polarized light beam splitter 59 is so designed that it allows the incident light beam 13, which has passed through the ½ wave plate 60, i.e. the incident light beam 13 vibrating in parallel to y-axis, to pass and reflects the incident light beam 13, which does not pass through the ½ wave plate 60, i.e. the incident light beam 13, which vibrates in parallel to x-axis.

After entering the transparent liquid 1 through the first entry window 51, the incident light beam 13 passes through the liquid movement preventing plate 88 of the liquid movement preventing device 55 and enters the free liquid surface 3 at a given angle, e.g. at 50°, under the condition of FIG. 16. After being reflected by the free liquid surface 3, it passes through the liquid movement preventing plate 68 as the reflection light beam 30 and is emitted through the first emitting window 53. The incident light beam 13 entering the transparent liquid 1 via the second entry window 52 passes through the liquid movement preventing plate 68 of the liquid movement preventing device 55 and enters the free liquid surface 3 at a given angle, e.g. at 50°, under the condition shown in FIG. 17. The reflection light beam 30 reflected by the free liquid surface 3 passes through the liquid movement preventing plate 68 and is emitted via the second emitting window 54.

There are provided a reflection mirror 19, which reflects the reflection light beam 30 emitted from the first emitting window 53 in vertical direction, and an anamorphic prism system 20 between the first emitting window 53 and the reflection mirror 19. Along the optical axis of the reflection light beam 30 reflected by the reflection mirror 19, a beam expander 21, a polarized light beam splitter 63, and a rotary pentagonal prism 66 rotated by rotating means such as a motor are sequentially arranged.

A reflection mirror 64 is arranged opposite to the second emitting window 54, and the reflection light beam 30 emitted from the second emitting window 54 is guided by the reflection mirror 84 toward the polarized light beam splitter 63. A beam expander 65 is disposed between the polarized light beam splitter 63 and the reflection mirror 64 so that the optical axis of the reflection light beam 30 reflected by the polarized light beam splitter 63 agrees with the optical axis of the light beam, which has passed through the polarized light beam splitter 63. The polarized light beam splitter 63 is so designed that it allows the light beam vibrating in parallel to z-axis to pass and reflects the light beam vibrating in parallel to x-axis.

In the following, operation of the embodiment is described.

The incident light beam 13, which is emitted from the light source unit 57, passes through the 1/2 wave plate 60 and is vibrated in y-axis direction, passes through the polarized light beam splitter 59 and enters the transparent liquid 1 via the first entry window 51 and is totally reflected by the free liquid surface 3. The point of reflection of the transparent liquid 1 is consistent or nearly consistent with the axis of rotation of the liquid movement preventing device 55.

After being reflected by the free liquid surface 3 of the transparent liquid 1, the reflection light beam 30 is emitted through the first emitting window 53 and passes through the anamorphic prism system 20. Then, it is reflected in vertical direction by the reflection mirror 19 and further passes through the beam expander 21 and the polarized light beam splitter 63 and is emitted in horizontal direction by the rotary pentagonal prism 66.

As described above, the anamorphic prism system 20 equalizes reflection sensitivity on the free liquid surface 3 in all directions and the beam expander 21 ultimately adjusts the sensitivity. Therefore, the optical axis of the light beam passing through the beam expander 21 is always compensated in vertical direction regardless of the tilting of the entire system. Accordingly, the reflection light beam 30 emitted from the rotary pentagonal prism 66 forms the horizontal reference line. By rotating the rotary pentagonal prism 66, it is possible to obtain a constant horizontal reference plane at all times. In other words, the present invention can be applied to a leveling instrument.

FIG. 17 represents the entire system rotated by 90°.

The liquid movement preventing device 55 is rotated by 90° so that the liquid movement preventing plate 68 is held at horizontal position. Because the free liquid surface 3 of the transparent liquid 1 is always kept horizontally with respect to the center of gravity, it is rotated by 90°, following the 90° rotation of the entire system. The ½ wave plate 60 is also rotated by 90° and is deviated from optical path of the incident light beam 13. Therefore, the incident light beam 13 having vibration in x-axis direction enters the polarized light beam splitter 59, and the incident light beam 13 is reflected toward the reflection mirror 61 by the polarized light beam splitter 59. After being reflected by the reflection mirror 61 and entering via the second entry window 52, the incident light beam 13 is totally reflected by the free liquid surface 3. In this case, the point of reflection of the incident light beam 13 on the transparent liquid 1 is consistent or nearly consistent with the axis of rotation of the liquid movement preventing device 55.

After being reflected by the free liquid surface 3, the reflection light beam 30 is emitted via the second emitting window 54, is reflected by the reflection mirror 64, passes through the beam expander 65 and is further reflected in horizontal direction by the polarized light beam splitter 63, running along the same optical axis as the optical axis of the reflection light beam before the system is turned down by 90°. Because the entire optical system is turned down by 90°, the optical axis of the reflection light beam 30 reflected by the polarized light beam splitter 63 is kept always in horizontal direction. By rotating the rotary pentagonal prism 66, the irradiated and formed reference plane is changed in vertical direction, and it is possible to obtain the rotated and irradiated plane always maintained in vertical direction in the z-y plane regardless of the tilting of the entire system.

In this case, for the optical axis when the entire system is turned down by 90° as shown in FIG. 17, compensation is done in vertical direction in the z-y plane, but optical axis is not compensated with regard to the x-y plane. Because the system is rotated and matches the reference when the vertical irradiation plane is aligned with the reference point, it is more convenient that the movement in rotating direction of the irradiation plane is slow when the system is installed.

The first entry window and the second entry window may be integrated as shown in FIG. 16 or may be separately furnished. By defining the direction of polarization in this manner, it is possible to suppress attenuation of light in the beam splitter as much as possible.

The transparent liquid 1 sealed in the liquid sealing container 2 is moved by external vibration, while this liquid movement is suppressed by the liquid movement preventing device 55.

Figure 18:
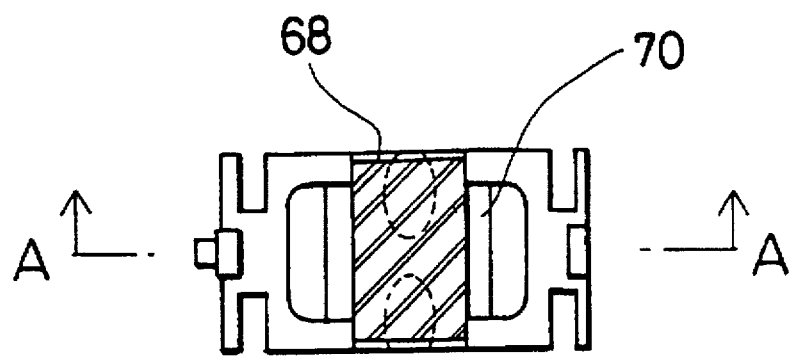
FIG. 18 is a plan view of a liquid movement preventing device used in the present invention.
Figure 19:
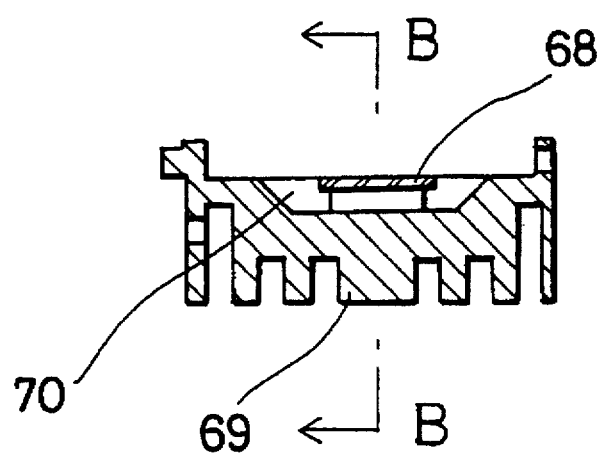
FIG. 19 is an arrow diagram along the line A—A of the device of FIG. 18.
Figure 20:
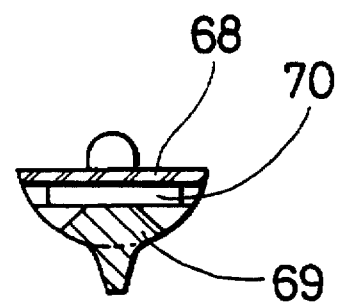
FIG. 20 is an arrow diagram along the line B—B of the device of FIG. 19.

In connection with FIGS. 18 to 20, description will be given on a liquid movement preventing device 55, which is modified from the liquid movement preventing device 10 shown in FIGS. 4 to 6.

The liquid movement preventing device 55 comprises the liquid movement preventing plate 68 and a moving plate support 69, and the liquid movement preventing plate 68 is provided horizontally on upper surface of the moving plate support 69.

The axis of rotation of the moving plate support 69 passes slightly above the liquid movement preventing plate 68, and the center of gravity of the liquid movement preventing device 55 is within the plane, which includes the axis of rotation and is perpendicular to the liquid movement preventing device 68 and is located below the liquid movement preventing plate 68. A recess 70 is formed on upper surface of the moving plate support 69, and the liquid movement preventing plate 68 is spanned over and fixed on the recess 70. The liquid movement preventing plate 68 is made of transparent glass material to prevent attenuation of light. On lower surface of the moving plate support 69, parallel grooves are formed in rotating direction in form of a comb, and adequate resistance is generated in the transparent liquid 1. A material having high thermal conductivity such as copper is used as the material of the moving plate support 69, and its surface area is increased by designing it in comb-like shape. Thus, thermal conduction between the moving plate support 69 and the transparent liquid 1 is improved.

Natural frequency of the liquid movement preventing device 55 in the transparent liquid 1 is made lower than natural frequency of the transparent liquid 1. Thus, by the viscosity of the liquid and the resistance between the transparent liquid 1 and the moving plate support 69, the vibration of the liquid movement preventing device 55 is suppressed, and stability of the free liquid surface 3 is maintained.

Even when sudden change occurs in environmental temperature, temperature difference rarely occurs because the moving plate support 69 increases heat transmission toward inside the transparent liquid 1. This prevents the distribution of refractive indices and raises stability of the light beam.

It is needless to say that the reflection mirror 19 can be replaced with other reflection material such as prism.

As described above, it is possible according to the present invention to automatically compensate optical path regardless of whether the system is at horizontal position or at vertical position without requiring a specially prepared optical system or a surplus mechanism to replace a part of the optical system. As a result, the system is simple and easy to use and working efficiency is improved. At the same time, accuracy and reproducibility are increased. Because reflection of the free liquid surface is utilized, which is always maintained in horizontal direction, complicated assembling technique as required in the conventional pendulum type angle compensator is not needed and the system can be easily assembled. Instead of suspending optical components in the conventional pendulum type angle compensator, it will suffice only to infuse the liquid in the liquid sealing container. This means very simple work and less variation in the assembling accuracy due to individual difference. Because the liquid is completely sealed, no change occurs over time and resistance to environmental condition is high. To external vibration and impact, the liquid movement is controlled by utilizing the viscosity of the liquid, and no complicated movement control mechanism is required.

What we claim are:

1. An automatic tilt angle compensator apparatus, comprising a liquid sealing container with a transparent liquid sealed therein to form a free liquid surface, a light projecting system for projecting a light beam having an optical path to the free liquid surface at a given angle so that it is reflected by the free liquid surface, an optical path dividing means for dividing an optical path of the light beam projected by the projecting system into a pair of beams, a first light entry means for allowing one of said pair of beams to pass into the sealing container, a second light entry means for allowing the other of said pair of beams into the sealing container, a first light directing means for directing the light beam reflected by the free liquid surface toward the outside of the liquid sealing container where said light beam entered from said first entry means when said apparatus is tilted nearly by 0°, a second light directing means for directing the light beam reflected by the free liquid surface toward the outside of the liquid sealing container where said light beam entered from said second entry means when said apparatus is tilted by 90°.

2. An automatic tilt angle compensator according to claim 1, wherein an incident angle of the light beam projected to the free liquid surface is more than 45°.

3. An automatic tilt angle compensator apparatus according to claim 1, wherein the first light directing means is a first reflection member for reflecting the light beam reflected by the free liquid surface again toward the free liquid surface when said apparatus is tilted nearly by 0°, and the second light directing means is a second reflection member for reflecting the light beam reflected by the free liquid surface again toward the free liquid surface when said apparatus is tilted nearly by 90°.

4. An automatic tilt angle compensator apparatus according to claim 1, wherein the first light directing means is a first emitting window arranged on the liquid sealing container, and the second light directing means is a second emitting window arranged on the liquid sealing container.

5. An automatic tilt angle compensator apparatus according to claims 1 or 2, wherein the light beam projected from the light projecting system is polarized light having a defined direction of polarization, and wherein said light projecting system further comprises polarized light converting means for projecting polarized light beams having a different polarized property when said apparatus is tilted nearly by 0° and when it is tilted by nearly 90° toward said optical path dividing means, said optical path dividing means comprising a polarized light beam splitter.

6. An automatic tilt angle compensator apparatus according to claim 5, wherein said polarized light converting means comprises a first birefringence member removably arranged in the optical path of said light beam projected from said light projecting system depending upon the tilting of said apparatus and is used for rotating the direction of polarization of said light beam when it is arranged in said optical path.

7. An automatic tilt angle compensator apparatus according to claim 6, wherein said first birefringence member is a $\lambda/2$ phase plate.

8. An automatic tilt angle compensator apparatus according to claim 6, wherein said first light directing means comprises a first reflection member and said second light directing means comprises a second reflection member, and further comprising a second birefringence member for rotating the direction of polarization between said free liquid surface and said first reflection member and a third birefringence member for rotating the direction of polarization between said free liquid surface and said second reflection member.

9. An automatic tilt angle compensator apparatus according to claim 6, wherein one of said pair of beams has a first optical path and the other of said pair of beams has a second optical path, and further comprising a second birefringence member along said first optical path for rotating the direction of polarization between said polarized light beam splitter and said free liquid surface, and a third birefringence member along said second optical path for rotating the direction of polarization between said polarized light beam splitter said free liquid surface.

10. An automatic tilt angle compensator apparatus according to claim 8, wherein said second birefringence member is a $\lambda/4$ phase plate.

11. An automatic tilt angle compensator apparatus according to claim 1, wherein there is provided a photodetector for detecting tilting of said apparatus, and the projecting optical system guides the light beam reflected again by the free liquid surface and emitted from the liquid sealing container to the photodetector.

12. An automatic tilt angle compensator apparatus according to claim 1, wherein, the light beam emitted from the light projecting system has a direction of polarization, and wherein the direction of polarization is a defined polarized light, and the dividing means is a polarized light beam splitter, whereby the direction of polarization is rotated by a first birefringence member movably arranged on an optical axis between the light projecting system and the polarized light beam splitter, the movably arranged birefringence member is deviated from the optical axis when said apparatus is tilted by 90°, the optical axis from the light projecting system is separated from the optical axis, present before said apparatus has been tilted by 90°, by the polarized light beam splitter, and the light beam reflected by the free liquid surface is emitted from the liquid sealing container by the second light directing means.

13. An automatic tilt angle compensator apparatus according to claim 12, wherein said first birefringence member is a λ/2 phase plate.

14. An automatic tilt angle compensator apparatus according to claims 1, 2 or 4, wherein the light beams directed from the first light directing means and the second light directing means have optical axes, and wherein the optical axes of said light beams are made identical with each other by a polarized light beam splitter.

15. An automatic tilt angle compensator apparatus according to claim 14, wherein said polarized light beam splitter is furnished separately from the dividing means.

16. An automatic tilt angle compensator according to claims 1, 2, 3 or 11, wherein an incident angle to the liquid surface is set in such manner that the light beam is totally reflected by the free liquid surface.

17. An automatic tilt angle compensator apparatus according to claims 1, 2, 3 or 11, wherein a liquid movement preventing plate is provided rotatably about the reflecting position of the inner surface of the liquid.

18. An automatic tilt angle compensator apparatus according to claim 8, wherein said third birefringence member is a λ/4 phase plate.

* * * * *